US008184603B2

(12) United States Patent
Waylett et al.

(10) Patent No.: US 8,184,603 B2
(45) Date of Patent: May 22, 2012

(54) COMMUNICATION SYSTEM HAVING A COMMUNITY WIRELESS LOCAL AREA NETWORK FOR VOICE AND HIGH SPEED DATA COMMUNICATION

(75) Inventors: Nicholas S. Waylett, Lincoln City, OR (US); Chris P. McIntosh, San Francisco, CA (US)

(73) Assignee: LGC Wireless, LLC, San Jose, CA (US)

( * ) Notice: Subject to any disclaimer, the term of this patent is extended or adjusted under 35 U.S.C. 154(b) by 1965 days.

(21) Appl. No.: 10/893,611

(22) Filed: Jul. 15, 2004

(65) Prior Publication Data

US 2005/0088999 A1 Apr. 28, 2005

Related U.S. Application Data

(63) Continuation of application No. 10/655,152, filed on Sep. 3, 2003, now abandoned, which is a continuation of application No. 10/342,591, filed on Jan. 14, 2003, now abandoned.

(60) Provisional application No. 60/353,815, filed on Jan. 31, 2002.

(51) Int. Cl.
*H04W 4/00* (2009.01)
*H04B 7/14* (2006.01)

(52) U.S. Cl. .............................. 370/338; 455/15; 455/20

(58) Field of Classification Search .................. 370/328, 370/352, 340, 338, 401, 465, 466; 455/552, 455/456, 522, 11.1, 15, 16, 41.2, 420
See application file for complete search history.

(56) References Cited

U.S. PATENT DOCUMENTS

| | | | |
|---|---|---|---|
| 4,726,644 A | 2/1988 | Mathis | |
| 5,603,080 A | 2/1997 | Kallander et al. | |
| 5,621,786 A | 4/1997 | Fischer et al. | |
| 5,627,879 A | 5/1997 | Russell et al. | |
| 5,642,405 A | 6/1997 | Fischer et al. | |
| 5,644,622 A | 7/1997 | Russell et al. | |
| 5,657,374 A | 8/1997 | Russell et al. | |
| 5,682,256 A | 10/1997 | Motley et al. | |
| 5,765,099 A | 6/1998 | Georges et al. | |
| 5,774,789 A | 6/1998 | Van der Kaay et al. | |
| 5,781,865 A | 7/1998 | Gammon | |
| 5,787,344 A | 7/1998 | Scheinert | |
| 5,852,651 A | 12/1998 | Fischer et al. | |
| 5,883,882 A | 3/1999 | Schwartz | |
| 5,907,544 A | 5/1999 | Rypinski | |
| 5,930,682 A | 7/1999 | Schwartz et al. | |

(Continued)

*Primary Examiner* — Kwang B Yao
*Assistant Examiner* — Awet Haile
(74) *Attorney, Agent, or Firm* — Fogg & Powers LLC

(57) ABSTRACT

A system (100) and method for providing high capacity voice and high speed data communication between user equipment terminals (UEs 104) and a public network (108). Generally, the system (100) includes a community Wireless Local Area Network (WLAN 102) having a centralized base transceiver station (CBTS 114) coupled to a public network (108), and several remote transceiver stations (RTSs 118) each coupled to several UEs (104), and, via a radio link, to the CBTS. In one embodiment, the CBTS (114) and RTSs (118) include a Global Systems for Mobile communication/General Packet Radio Service (GSM/GPRS) transceiver (148, 154) to provide data communication, and a WLAN transceiver (150, 156) to provide voice communication. Preferably, the WLAN transceiver (150, 156) is compatible with an open standard, such as IEEE 802.11. More preferably, the CBTS (114) and RTSs (118) include frequency converters (152, 158), to up-convert a frequency of signals generated in at least one of the transceivers to couple the CBTS to the RTS via a signal at a frequency above standard GSM frequencies.

15 Claims, 16 Drawing Sheets

U.S. PATENT DOCUMENTS

| | | | |
|---|---|---|---|
| 5,949,775 A * | 9/1999 | Rautiola et al. | 370/338 |
| 5,956,331 A * | 9/1999 | Rautiola et al. | 370/338 |
| 5,969,837 A | 10/1999 | Farber et al. | |
| 5,978,650 A | 11/1999 | Fischer et al. | |
| 5,983,070 A | 11/1999 | Georges et al. | |
| 5,999,813 A * | 12/1999 | Lu et al. | 455/435.2 |
| 6,005,884 A | 12/1999 | Cook et al. | |
| 6,014,546 A | 1/2000 | Georges et al. | |
| 6,081,716 A * | 6/2000 | Lu | 455/445 |
| 6,128,496 A | 10/2000 | Scheinert | |
| 6,151,480 A | 11/2000 | Fischer et al. | |
| 6,157,810 A | 12/2000 | Georges et al. | |
| 6,178,512 B1 | 1/2001 | Fifield | |
| 6,192,216 B1 | 2/2001 | Sabat, Jr. et al. | |
| 6,243,577 B1 * | 6/2001 | Elrefaie et al. | 455/426.2 |
| 6,353,600 B1 | 3/2002 | Schwartz et al. | |
| 6,353,728 B1 | 3/2002 | Fischer et al. | |
| 6,360,075 B1 | 3/2002 | Fischer et al. | |
| RE37,820 E | 8/2002 | Scheinert | |
| 6,430,395 B2 * | 8/2002 | Arazi et al. | 455/41.2 |
| 6,459,900 B1 | 10/2002 | Scheinert | |
| 6,480,702 B1 | 11/2002 | Sabat, Jr. | |
| 6,556,551 B1 | 4/2003 | Schwartz | |
| 6,574,472 B1 | 6/2003 | Scheinert | |
| 6,594,496 B2 | 7/2003 | Schwartz | |
| 6,597,912 B1 * | 7/2003 | Lu et al. | 455/445 |
| 6,608,832 B2 * | 8/2003 | Forslow | 370/353 |
| 6,694,134 B1 | 2/2004 | Lu et al. | |
| 6,771,933 B1 | 8/2004 | Eng et al. | |
| 6,785,558 B1 | 8/2004 | Stratford et al. | |
| 6,801,767 B1 | 10/2004 | Schwartz | |
| 6,804,532 B1 * | 10/2004 | Moon et al. | 455/552.1 |
| 6,826,163 B2 | 11/2004 | Mani et al. | |
| 6,826,164 B2 | 11/2004 | Mani et al. | |
| 6,954,439 B2 * | 10/2005 | Pulkkinen et al. | 370/280 |
| 6,954,616 B2 * | 10/2005 | Liang et al. | 455/63.1 |
| 7,039,025 B1 * | 5/2006 | Menon et al. | 370/328 |
| 7,039,027 B2 * | 5/2006 | Bridgelall | 370/329 |
| 7,039,399 B2 | 5/2006 | Fischer | |
| 7,117,015 B2 | 10/2006 | Scheinert et al. | |
| 7,127,175 B2 | 10/2006 | Mani et al. | |
| 7,133,697 B2 * | 11/2006 | Judd et al. | 455/561 |
| 7,149,521 B2 * | 12/2006 | Sundar et al. | 455/435.1 |
| 7,205,864 B2 | 4/2007 | Schultz, Jr. et al. | |
| 7,313,415 B2 | 12/2007 | Wake et al. | |
| 7,400,832 B2 | 7/2008 | Beacham et al. | |
| RE40,564 E | 11/2008 | Fischer et al. | |
| 7,450,939 B2 | 11/2008 | Scheinert | |
| 7,469,105 B2 | 12/2008 | Wake et al. | |
| 7,548,695 B2 | 6/2009 | Wake | |
| 7,555,300 B2 | 6/2009 | Scheinert et al. | |
| 7,580,424 B2 * | 8/2009 | Ravishankar et al. | 370/468 |
| 7,764,655 B2 | 7/2010 | Ransome et al. | |
| 7,817,958 B2 | 10/2010 | Scheinert et al. | |
| 7,844,273 B2 | 11/2010 | Scheinert | |
| 7,848,770 B2 | 12/2010 | Scheinert | |
| 2002/0025779 A1 * | 2/2002 | Knight et al. | 455/11.1 |
| 2002/0037717 A1 * | 3/2002 | Laube et al. | 455/422 |
| 2002/0085516 A1 * | 7/2002 | Bridgelall | 370/329 |
| 2002/0086682 A1 | 7/2002 | Naghian | |
| 2002/0090966 A1 * | 7/2002 | Hansen et al. | 455/522 |
| 2002/0147008 A1 * | 10/2002 | Kallio | 455/426 |
| 2002/0150084 A1 | 10/2002 | Lee et al. | |
| 2002/0160748 A1 | 10/2002 | Rahman et al. | |
| 2003/0021252 A1 | 1/2003 | Harper et al. | |
| 2003/0081565 A1 | 5/2003 | McIntosh et al. | |
| 2006/0019664 A1 * | 1/2006 | Nelakanti et al. | 455/436 |
| 2007/0008939 A1 | 1/2007 | Fischer | |
| 2007/0167149 A1 * | 7/2007 | Comstock et al. | 455/405 |
| 2008/0174502 A1 | 7/2008 | Oren et al. | |
| 2008/0175175 A1 | 7/2008 | Oren et al. | |
| 2008/0268835 A1 * | 10/2008 | Struhsaker | 455/426.2 |

* cited by examiner

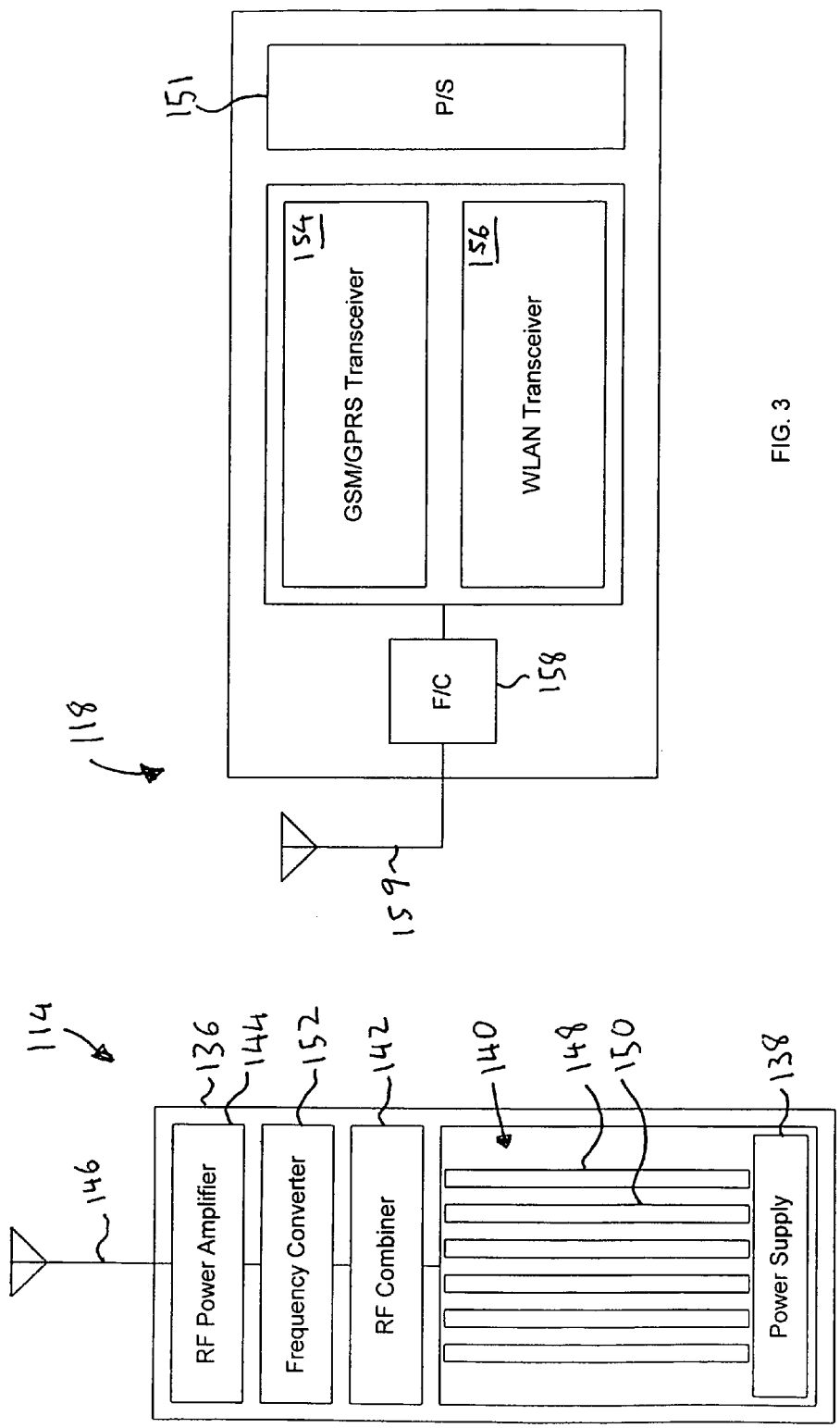

COMMUNICATION SYSTEM HAVING A COMMUNITY WIRELESS LOCAL AREA NETWORK FOR VOICE AND HIGH SPEED DATA COMMUNICATION

REFERENCE TO RELATED APPLICATIONS

This application is a continuation of U.S. patent application Ser. No. 10/655,152, entitled Communication System Having a Community Wireless Local Area Network for Voice and High Speed Data Communication, filed Sep. 3, 2003, now abandoned which is a Continuation of U.S. patent application Ser. No. 10/342,591 entitled Communication System Having a Community Wireless Local Area Network for Voice and High Speed Data Communication, filed Jan. 14, 2003, now abandoned which claims the priority to U.S. Provisional Application Ser. No. 60/353,815, entitled Communication System Having a Community Wireless Local Area Network for Voice and High Speed Data Communication, filed Jan. 31, 2002, which is incorporated herein by reference.

FIELD

The present invention relates generally to communication systems, and more particularly to a communication system including a community Wireless Local Area Network (WLAN) to provide voice and data communication between a number of user equipment terminals and a public network via the community WLAN, and a method for using the same.

BACKGROUND

The use of communication networks and devices, including telephones, pagers, facsimile machines, computers and network access appliances, has increased exponentially in recent years. In many areas and communities, this increased demand for voice and data communication services has outpaced the growth in the public infrastructure required to support these services.

One possible solution to the above problem is the use of conventional public or private wireless networks. However, this approach is not wholly satisfactory for a number of reasons. A fundamental drawback to the use of conventional wireless networks is the cost associated with radios or user equipment terminals (UEs) capable of communicating with conventional GSM (Global Systems for Mobile communication), GPRS (General Packet Radio Service) or 3G (third generation cellular) wireless networks. Although the expense of these UEs is generally not borne by a service provider of a wireless network providing voice and/or data communication to a community, it will be appreciated that higher costs translates to fewer potential subscribers. Thus, it is less likely the service provider would be willing to bear the expense of installing necessary base stations and switching centers in the community.

Another problem in areas or communities that are under served by an existing wireless network, is the difficulty and expense of scaling the network to provide services to additional users or additional services. For example, the typical approach used by wireless network service providers to provide increased capacity, is to install additional base stations and switching centers. As noted above, due to the expense this is unacceptable in certain rural or impoverished areas and communities. Moreover, this is also unacceptable in many developed and urban areas, where overcrowding of the licensed frequency bands leads to diminishing increases in capacity for additional base stations and switching centers due to interference with overlapping base stations.

Accordingly, there is a need for an inexpensive communication system and method of operating the same, that are capable of providing voice and high speed data communication to users in communities hitherto un-served or under served by conventional communication systems. There is a further need for a communication system and method of operating the same that can be quickly and inexpensively scaled up to provide service to increasing numbers of users. There is a still further need for a communication system and method of operating the same that provides a high capacity for voice and data communication.

The system and method of the present invention provides these and other advantages over the prior art.

SUMMARY

It is an object of the present invention to provide a communication system having capable of providing high capacity voice and high speed data communication between a number of user equipment terminals (UEs) and a public network via a community Wireless Local Area Network (WLAN).

In one aspect the invention is directed to a communication system for providing voice and data communication between a public network and a number of UEs. Generally, the communication system includes a community WLAN having a centralized base transceiver station (CBTS) coupled to the public network, and a number of remote transceiver stations (RTSs) each coupled to a number of the UEs, and, via a radio link, to the CBTS. Preferably, the public network includes a public switched telephone network and the Internet, and the CBTS is coupled to the public network via a trunk. Alternatively, the CBTS may be coupled to the public network via a satellite link or other public wireless network.

In one embodiment, the CBTS and each RTS includes a Global Systems for Mobile communication/General Packet Radio Service (GSM/GPRS) transceiver to provide data communication between the public network and the UEs, and a WLAN transceiver to provide voice communication between the public network and the UEs. The WLAN transceiver is compatible with an open standard protocol, for example, HIgh Performance Local Area Network (HiperLAN/1), HIgh Performance Local Area Network (HiperLAN/2), and Institute of Electrical and Electronics Engineers 802.11 (IEEE 802.11).

In another embodiment, the CBTS and each RTS includes a frequency converter, to up-convert a frequency of signals generated in at least one of the transceivers in the CBTS and the RTS to couple the CBTS to the RTS via a radio signal at a frequency above a standard GSM frequency band of about 900 Mhz. Preferably, the CBTS and RTSs are adapted to communicate using GSM technology at a frequency band within (ETSI) specification. More preferably, the CBTS and RTSs are adapted to communicate using GSM technology at a frequency band of at least about 3.5 Ghz.

In another aspect, the invention is directed to a transceiver station for use in a communication system. Generally, the transceiver station includes an antenna, a Global Systems for Mobile communication (GSM) transceiver, and a frequency converter coupled between the GSM transceiver to enable communication using GSM technology at a frequency above conventional GSM frequency bands. Preferably, the transceiver station is adapted to communicate using GSM technology at a frequency band within (ETSI) specification. More preferably, the transceiver station is adapted to communicate using GSM technology at a frequency band of at least about 3.5 Ghz.

In one embodiment, the GSM transceiver is a GSM/General Packet Radio Service (GSM/GPRS) transceiver, and the transceiver station is adapted to communicate data as well as voice.

In yet another aspect, the invention is directed to a method of providing voice and data communication between a number of UEs and a public network, using a communication system including a community WLAN. Generally, the method includes steps of: (i) receiving call information in the community WLAN; (ii) providing subscriber identification and security information for the UE to the community WLAN; and (iii) coupling the UE to the public network over the community WLAN.

In one embodiment, the public network includes a public switched telephone network and the Internet, and the step of coupling the UE to the public network involves coupling the CBTS to the public network via a trunk. Alternatively, the CBTS may be coupled to the public network via a satellite link or other public wireless network.

In another embodiment, the CBTS and each RTS includes a Global Systems for Mobile communication/General Packet Radio Service (GSM/GPRS) transceiver, and the step of coupling the UE to the public network is accomplished by coupling the CBTS to the RTS using a GSM standard to provide data communication between the public network and the UEs. In one version of this embodiment, the CBTS and each RTS further includes a WLAN transceiver, and the step of coupling the UE to the public network involves coupling the CBTS to the RTS using a WLAN standard to provide voice communication between the public network and the UEs. Preferably the WLAN standard is an open standard protocol, such as the HIgh Performance Local Area Network (HiperLAN/1) standard, the HiperLAN/2 standard, or an Institute of Electrical and Electronics Engineers 802.11 (IEEE 802.11) standard.

In yet another embodiment, the CBTS and each of the RTSs includes a frequency converter, and the step of coupling the UE to the public network includes the step of up-converting a frequency of a signal generated in at least one of the GSM/GPRS and the WLAN transceivers to couple the CBTS to the RTS via a radio signal at a frequency above a standard GSM frequency band of 900 Mhz. Preferably, the step of up-converting the frequency of the signal involves up-converting the frequency of the signal to a frequency band within (ETSI) specification. More preferably, the step of up-converting the frequency of the signal involves up-converting the frequency of the signal to a frequency band of at least about 3.5 Ghz.

Advantages of the apparatus and method of the present invention include: low cost to manufacture and install; high speed transmission of data, up to 54 to 100 Mbps; high capacity for voice and data communication; and easy scalability since, an 802.11 based WLAN, for example, permits up to 256 RTSs per CBTS.

It is also an object of the present invention to provide a communication system that bridges the gap between an existing public network and WLANs to provide authentication and roaming capabilities of the former with the high-speed and high-bandwidth of the latter.

It is a further object of the present invention to provide a communication system in which a UE terminal of a WLAN operating in an unregulated frequency band is able to access a public network, such as a public switched telephone network, a public GSM cellular network, public 3G network, or the Internet, and/or a private network, such as a private cellular network, a campus or enterprise 3G network, or a private branch exchange (PBX) with a functionality and capabilities similar to those available from mobile stations of more expensive GSM cellular networks and 3G cellular networks.

It is a still further object of the present invention to provide a communication system in which GSM/GPRS/3G broadband services are provided using WLAN broadband technology and in particular using 802.11 based technology.

In one aspect, the present invention is directed to communication system which enables a user to access a public network through low powered unregulated user equipment terminals (UEs) or transceivers. Generally, the communication system includes a public cellular network and a wireless local area network (WLAN) coupled to the public cellular network, the WLAN configured to facilitate communication between the UEs and the public cellular network. The public cellular network can be a global system for mobile communications (GSM) network coupled to a public switched telephone network (PSTN). Alternatively, the public cellular network can further include a third-generation mobile communications (3G) network coupled to the GSM network and to the Internet. Optionally, the communication system further includes a private cellular network coupled to the WLAN to facilitate communication between the UEs and mobile stations associated with the private cellular network.

In one embodiment, the communication system further comprises a Remote Authentication Dial In User Service (RADIUS) server to authenticate UEs accessing the communication system through the WLAN and to authorize access to the communication system. Where the communication system includes multiple linked WLANs, a home location registry (HLR), including, for example, a home location register and/or a home subscription sever, and visitor location registry (VLR) coupled to the RADIUS server provide roaming capabilities for the UEs among the plurality of WLANs.

In another embodiment, the UE includes a computer program to enable it to access and control supplementary services and/or value-added services provided by the public and/or private network. Supplementary services include, for example, Voice Group Call Service, Voice Broadcast Service, Service definition Line Identification Supplementary Services, Call Forwarding Supplementary Services, Call Waiting and Call Hold Supplementary Services, Multiparty call conferencing, Closed User Group Supplementary Services, Advice of Charge Supplementary Services, Call Barring Supplementary Services, Unstructured Supplementary Service Data, Explicit Call Transfer, Completion of Calls to Busy Subscriber, Short Message Service, and Follow Me. Value-added services include, for example, e-mail, calender, and wireless inventory, etcetera.

Preferably, the WLAN is compatible with one or more high performance wireless communication standards. For example, a European Telecommunications Standards Institute (ETSI) standard for Broadband Radio Access Networks (BRAN), such as a high performance local area network (HiperLAN/1), HiperLAN/2, or a high performance Metropolitan Access Network (HiperMAN). Other examples, include Institute of Electrical and Electronics Engineers 802.11 standards (IEEE 802.11), such as 802.11(a) and 802.11(b).

A communication system according to the present invention is particularly useful to operators of hotels, hotel chains, airports, airport building maintenance, and other like enterprises for deployment of in-building broadband RF services, or for users of UEs with e-mail messaging capabilities.

In another aspect, the present invention is directed to a method of enabling a number of UEs to communicate with a public network and/or private network via the WLAN. Generally, the method includes steps of: receiving in the WLAN call information to or from one of the number of UEs; providing subscriber identification and security information for the UE to an authentication server; and coupling the UE to the public network or private network over the WLAN.

Preferably, the communication between the UEs and the public cellular network facilitated by the WLAN includes voice communication. More preferably, the UE further includes computer program necessary to access or control supplementary services and/or value added services provided by the public network or private network, and the method further includes the step of controlling such supplementary services and/or value added services.

In one embodiment, the UE further includes a memory system having subscriber identification and security information stored therein, and the step of providing subscriber identification and security information for the UE to the authentication server is accomplished by providing subscriber identification and security information associated from the memory system. Alternatively, the UE further includes or is coupled to a card holder/reader holding a number of GSM-type SIM cards or 3G-type USIM cards, and the step of providing subscriber identification and security information for the UE to the public cellular network involves reading subscriber identification and security information stored in one of the cards held in the card holder/reader, which may be public network or private network subscription identifiers, or a combination of both public and private subscription data.

The communication system and method of the present invention is particularly useful in public cellular network including a GSM network coupled to a PSTN and/or a 3G-network coupled to a GSM network, to the PSTN and/or to the Internet. The communication system and method provide a means for coupling an 802.11 network coupled to the GSM network and the 3G-network to facilitate communication between a number of UEs and the public cellular network. Generally, the communication system includes means for authenticating and authorizing access to the system. The means for authenticating and authorizing access can include a RADIUS system or server coupled to the communication system through a VLR/RADIUS interface.

BRIEF DESCRIPTION OF THE FIGURES

These and various other features and advantages of the present invention will be apparent upon reading of the following detailed description in conjunction with the accompanying drawings, where:

FIG. 2 is a block diagram of a Centralized Base Transceiver Station (CBTS) of a community WLAN according to an embodiment of the present invention;

FIG. 3 is a block diagram of one of a plurality of Remote Transceiver Stations (RTSs) of a community WLAN according to an embodiment of the present invention;

DETAILED DESCRIPTION

The present invention is directed to a communication system and method for providing high capacity voice and high speed data communication between a number of user equipment terminals (UEs) and a public network via a communication system including a community Wireless Local Area Network (WLAN).

Figure 1A:
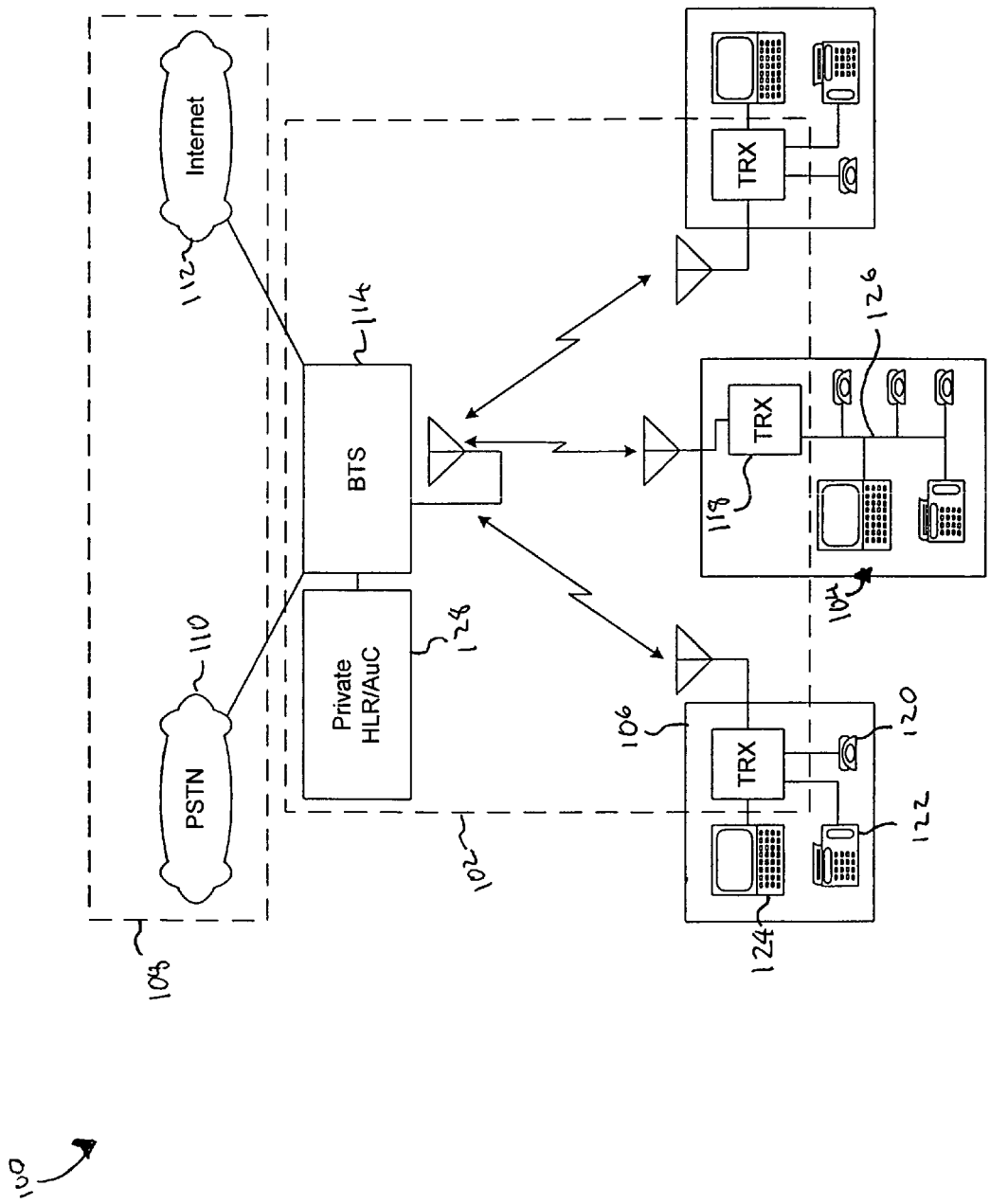
FIG. 1A is a block diagram of a communication system including a community Wireless Local Area Network (WLAN) according to an embodiment of the present invention.

A communication system according to the present invention will now be described with reference to FIG. 1A. FIG. 1A is an exemplary block diagram of a communication system having a community WLAN to couple a number of user equipment terminals (UEs) to a public network according to an embodiment of the present invention. For purposes of clarity, many of the details of communication systems and in particular of public networks that are widely known and are not relevant to the present invention have been omitted.

Referring to FIG. 1A, the inventive communication system 100 includes a community WLAN 102 to provide access for a number of UEs 104 at a number of different building or sites 106 to a public network 108 including a public switched telephone network (PSTN 110) and the Internet 112.

Generally, the community WLAN 102 includes a centralized base transceiver station (CBTS 114) coupled the public network via a landline or trunk 116, such as an E1 or T1 trunk. The CBTS 114 also couples via a radio link to a number of remote transceiver stations (RTS 118), generally one RTS permanently installed or fixed at each site 106, each of which in turn couples to a number of UEs 104, such as telephones 120, fax machines 122 and computers 124, to provide access to the public network 108 for voice or data communication. Each of the UEs 104 within a particular site 106 can be directly connected to the RTS 118 through a dedicated connection, or can be connected through a local area network (LAN 126), such as an Ethernet, 100Base T, Fast Ethernet or Gigabit Ethernet, at the site.

In a preferred embodiment, the community WLAN 102 further includes a private home location registry/authentication server (HLR/AuC 128) coupled to the CBTS 114 for recording and storing information relating to users or subscribers of the community WLAN. In operation, a RTS 118 or a UE 104 first introduced into an area served by the community WLAN 102 must provide authentication or authorization information to the HLR/AuC 128. Generally, the authentication/authorization is provided in a manner similar to that of a Global Systems for Mobile communication (GSM) mobile station in a conventional GSM wireless network. There are several are several ways of accomplishing this: (i) each UE 104 can be provided with a subscriber identity module (SIM) cards similar to those cards commonly found in GSM mobile stations; (ii) each RTS 118 can be provided with a number of SIM cards which it can associate with the UEs 104 on a permanent or temporary basis; or (iii) each RTS can be coupled to a memory system in which is stored subscriber identification and security information that constitutes a virtual SIM (VSIM), described in greater detail in commonly assigned, co-pending U.S. patent application Ser. No. 10/002,551, which is incorporated herein by reference.

Use of the HLR/AuC 128 and SIMs enables generation and recording of call detail records (CDRs) for billing purposes, facilitates incoming communication from the public network 108, and allows communication between UEs 104 at different sites 106 with the community WLAN 102 service area.

Optionally, the community WLAN 102 also include a visitor location registry (VLR) (not shown) to maintain subscriber information for visitors or roamers to the cell or area served by the community WLAN.

Figure 1B:
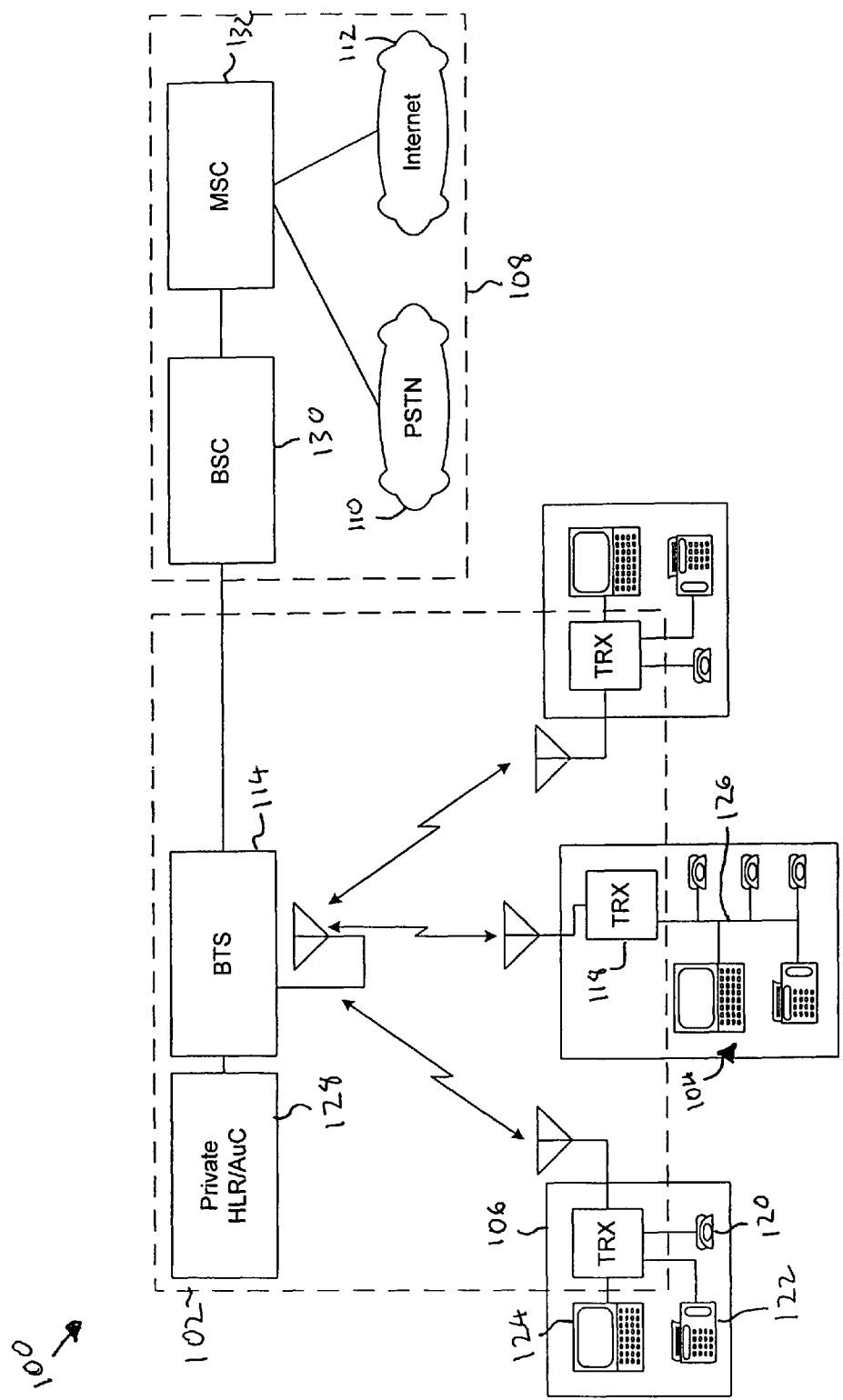
FIG. 1B is a block diagram of an alternative embodiment of the communication system of FIG. 1A.

FIG. 1B shows an alternative embodiment of the communication system 100 of FIG. 1A, in which the CBTS 114 is coupled to the PSTN 110 and the Internet 112 through a public network 108 further comprising a public wireless network including a base station controller (BSC 130) and a mobile switching center (MSC 132). This embodiment, may be particularly useful in under served areas or communities in which a demand for communication services has outstripped the capacity of an existing wireless or wired communication system (not shown).

Figure 1C:
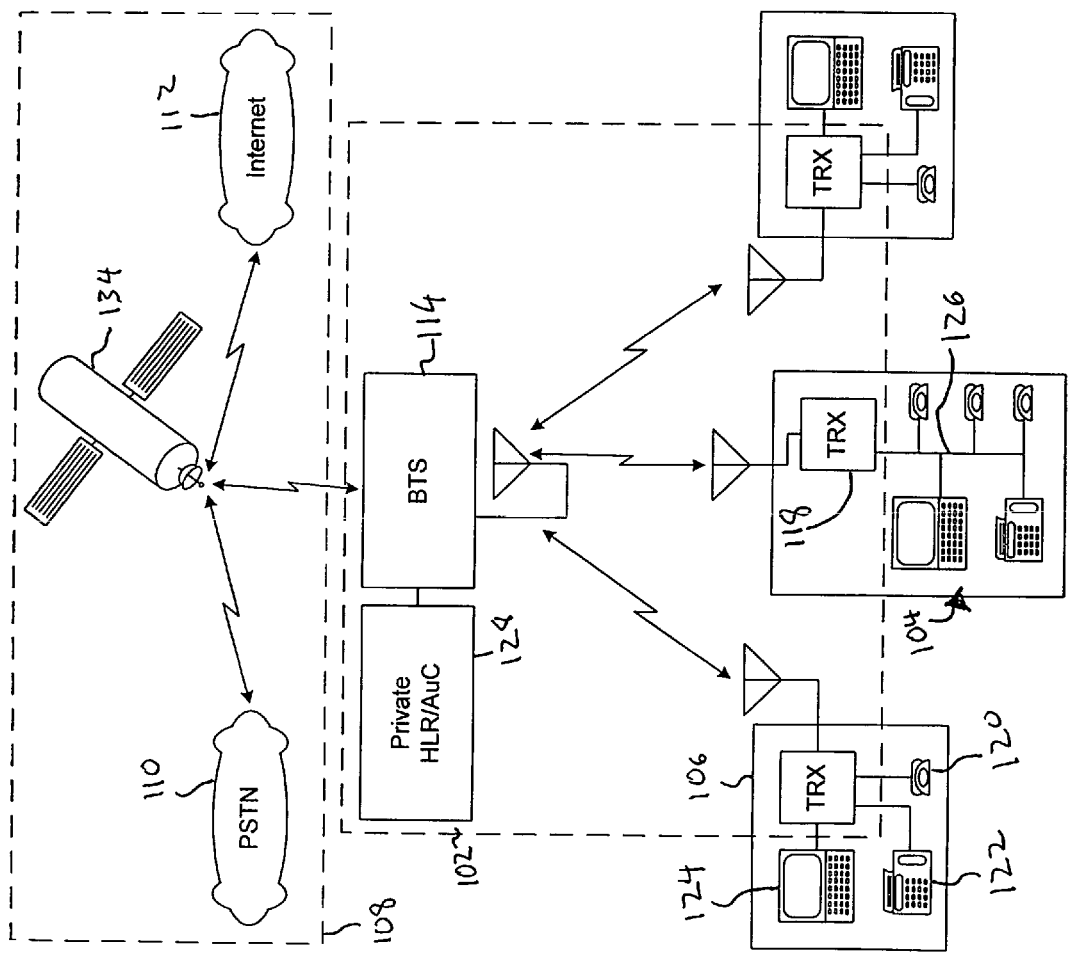
FIG. 1C is a block diagram of another alternative embodiment of the communication system of FIG. 1A.

FIG. 1C shows another alternative embodiment of the communication system 100 of FIG. 1A, in which the CBTS 114 is coupled to the PSTN 110 and the Internet 112 through a satellite radio link via a satellite 134. This embodiment, may be particularly useful in areas or communities hitherto unserved by conventional wireless or wired communication s systems (not shown).

The major components of the community WLAN 102, that is the CBTS 114 and the RTSs 118, will now be described in greater detail with reference to FIGS. 2 and 3.

Referring to FIG. 2, preferably the CBTS 114 is a complete stand-alone Network-In-a-Box (NIB), such as a WAVEXpress NIB platform, commercially available from Interwave Communications, of Menlo Park, Calif. Generally, the CBTS 114 includes within a single enclosure 136: (i) a power supply 138; (ii) a number of plug-in-modules or cards 140, including a number of radio frequency (RF) transceivers for communicating with the RTSs 118; (iii) an RF combiner 142 for combining signals to and/or from the multiple transceivers; (iv) an RF power amplifier 144 for amplifying received and/or transmitted signals; and (v) an antenna 146. Preferably, the cards 140 include at least one GSM/GPRS transceiver 148 capable of providing data communication between the public network 108 and the UEs 104 using GSM standard or technology. More preferably, the cards 140 also include at least one WLAN transceiver 150 capable of capable of providing data communication to the UEs 104 using an open standard protocol, such as the HIgh Performance Local Area Network (HiperLAN/1) standard, the HiperLAN/2 standard, or an Institute of Electrical and Electronics Engineers 802.11 (IEEE 802.11) standard. Most preferably, both the GSM/GPRS transceiver 148 and the WLAN transceiver 150 are capable of non-line of sight (NLOS) operation. That is they are capable of communicating with RTSs 118 that are obscured or shielded from the CBTS 114 by intervening vegetation, buildings or terrain.

In addition, the cards 140 can include a number of cards or module for interfacing with the HLR/AuC 128, and the trunk 116 to connecting to the public network 108. For example, the cards 140 can include an E1 card, T1 card or an ICP card.

Optionally, in accordance with another aspect of the present invention, the CBTS 114 further includes a frequency converter 152 to enable the CBTS to communicate with the RTSs 118 using the GSM standard with a signal having a frequency up-converted from a frequency band conventionally used in GSM systems or networks, thereby tapping into an unused or underused portion of the radio spectrum and increasing capacity of the community WLAN 102 and avoiding restrictions on transmission rates. Preferably, the frequency of the signal is up-converted to a frequency band within the specification developed by the European Telecommunications Standards Institute (ETSI) for GSM communication. More preferably, the frequency of the signal is upconverted to a frequency band of at least about 3.5 Ghz.

Referring to FIG. 3, the RTSs 118 generally include: (i) a power supply 151; (ii) at least one GSM/GPRS transceiver 154; (iii) a WLAN transceiver 156; (iv) a frequency converter 158; and (v) an antenna 159. Additionally, depending on the UEs 104 coupled to a particular RTS 118 and the manner in which they are coupled, the RTS can further include a number of interfaces or modules (not shown) for interfacing with the UEs. Such interfaces can include for example, TCP/IP interfaces, ethernet interfaces and SCSI interfaces.

Figure 4:
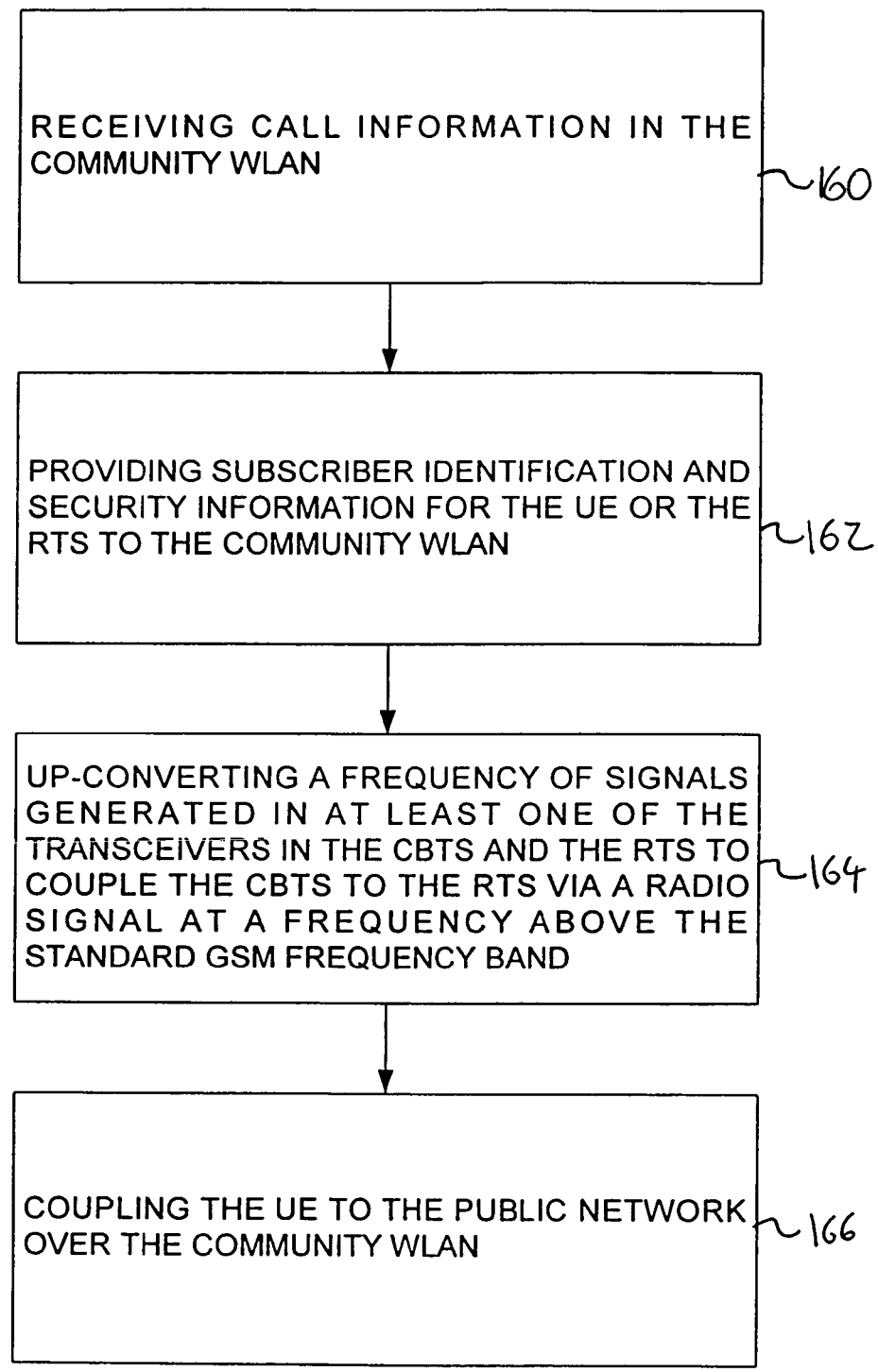
FIG. 4 is a flowchart showing an embodiment of a process according to the present invention for providing voice and data communication between a plurality of User Equipment terminals (UEs) and a public network via a community WLAN.

A process or method for operating communication system 100 according to an embodiment of the present invention will now be described with reference to FIG. 4. FIG. 4 is a flowchart showing an embodiment of a method for providing voice and data communication between the UEs 104 and the public network 108 via the community WLAN 102. In the method, call information, from either one of the UEs 104 or from the public network, is received in the community WLAN 102 (step 160). Subscriber identification and security information for the UE 104 is provided to the community WLAN 102 by the UE and verified by the HLR/AuC 128 (step 162). A frequency of signals generated in at least one of the transceivers in the CBTS 114 and the RTS 118 is up-converted to couple the CBTS to the RTS via a radio signal at a frequency above the standard GSM frequency band (step 164), and the UE 104 is coupled to the public network 108 over the community WLAN 102 (step 166).

In another aspect, the invention is directed to a communication system and method for enabling UEs associated with a WLAN to communicate with a public network.

Figure 5:
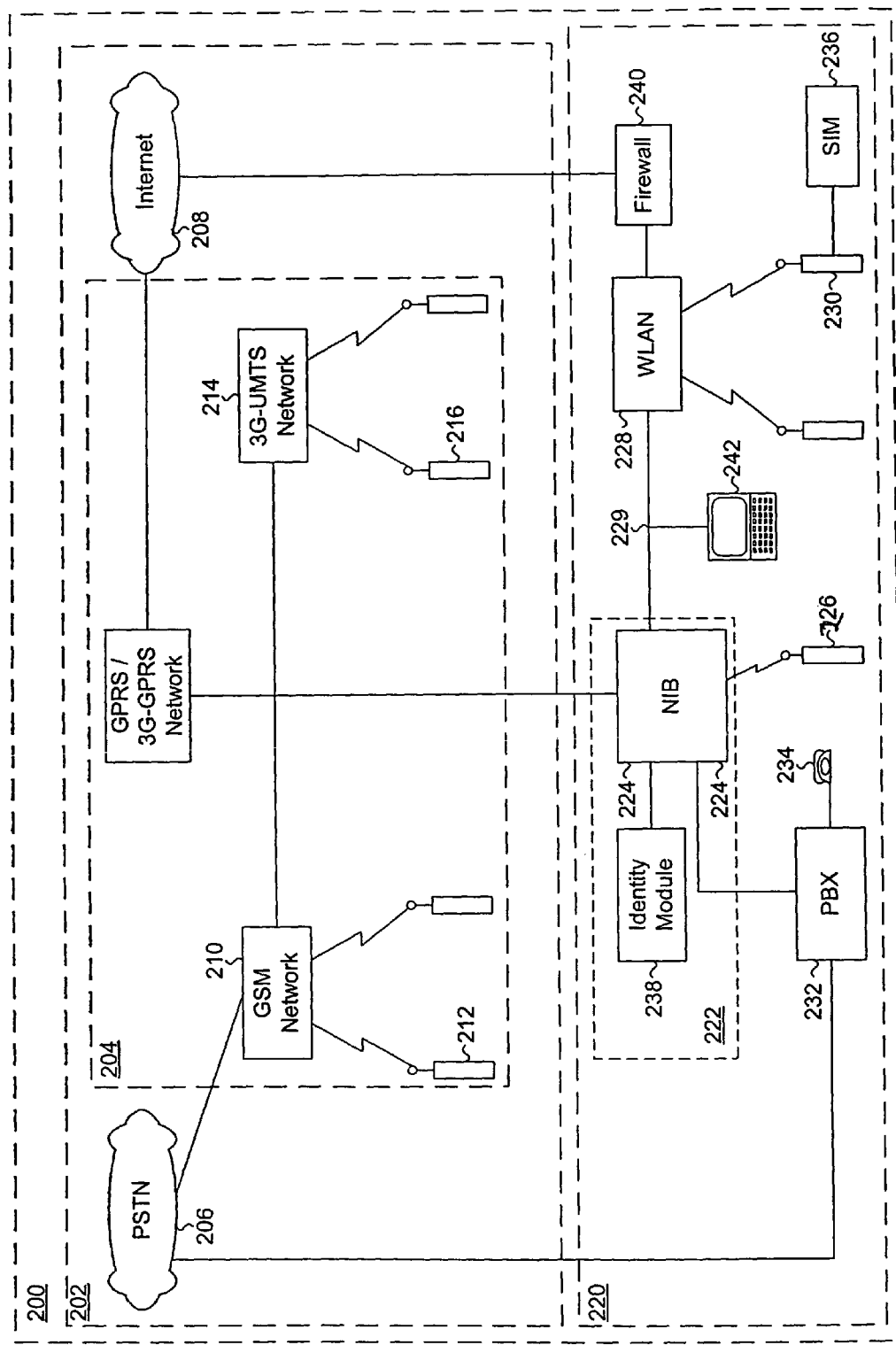
FIG. 5 is a block diagram of a communication system according to an embodiment of the present invention having a private network including a wireless local area network (WLAN) coupled to a private cellular network and a private branch exchange, and a public network having a public global system for mobile communications (GSM) network and a public third☐generation mobile communications (3G) network.

A communication system according to the present invention will now be described with reference to FIG. 5. FIG. 5 is an exemplary block diagram of a communication system having a WLAN coupled to a public network including a GSM network and a 3G network according to an embodiment of the present invention. For purposes of clarity, many of the details of communication systems and in particular of GSM networks and 3G-networks that are widely known and are not relevant to the present invention have been omitted.

Referring to FIG. 5, the communication system 200 generally comprises a public core network or public network 202 including a public cellular network 204 with connections to a PSTN 206 and the Internet 208. The public cellular network 204 can include a GSM 210 network for communicating with public MSs 212 and a 3G-network 214, such as a 3G-UMTS (universal mobile telecommunications system), for communicating with public UEs 216. The public cellular network 204 typically further includes a GPRS/3G-GPRS network 218.

The communication system 200 further includes a private network 220 with a private cellular network 222 for communicating with private MS 226, a WLAN 228 for communicating with private transceivers or UEs 230, and, optionally, a PBX 232 for communicating with PBX telephones 234. In one embodiment, the private cellular network 222 includes at least one WAVEXchange™ (WXC) or a Network-In-A-Box™ (NIB 224) commercially available from interWAVE Communications Inc., of Menlo Park, Calif. A WXC generally includes a MSC, a built-in VLR/HLR. The NIB 224 includes a MSC, a BSC and a BTS in a single enclosure. The private cellular network 220 is coupled to the GSM network 210, the GPRS network 218, and the 3G-network 214 of the public cellular network 204 through a number or interface functions or links, described in more detail below.

In accordance with the present invention, the WLAN 228 is coupled to the public network 202 through the NIB 224 and is adapted to enable voice and data communication between the private UEs 230 and the private mobile stations 226, public mobile stations 212, public UEs 216, PBX telephones 234, and telephones (not shown) coupled to the PSTN 206 and/or the Internet 208. Access points (not shown in this figure) of the WLAN 228 can be coupled to the NIB 224 through a wired local area network (LAN 229), such as an Ethernet, 100Base T, Fast Ethernet or Gigabit Ethernet, or through a wireless or radio-link (not shown). One advantage of the communication system 200 of the present invention is the ability to enable communication between the public network 202 and less expensive, low-power, unregulated private UEs 230 while providing substantially the same functions and services available from much more expensive radios, MSs 212 or UEs 216 of the public cellular network 204 and/or private cellular network 222.

It will be understood, that the communication system 200 can include a number of private cellular networks 222, each with an associated WLAN 228, and each linked by a private wide area network (PWAN) (not shown) to provide wireless or cellular type communication via a WLAN over an extended service area. This embodiment provides the further advantages of the ability to avoid tolls and maintain ownership and control of information transmitted between different sites of an enterprise linked by the PWAN.

In another embodiment, the private UE 230 further includes coupled thereto a subscriber identity module (SIM 236) having an algorithm and a key to support authentication and encryption necessary to enable or facilitate communication with the public network. 202 and/or private cellular network 224. In one version of this embodiment, each private UE 230 includes a card holder/reader (not shown in this figure) and one or more GSM-type SIM cards or 3G-type USIM cards (not shown) held in the card holder/reader, each SIM card subscriber identification and security information stored therein for one or more user profiles, which may include public network or private network subscription identifiers, or a combination of both public and private subscription data/identifiers. Alternatively, the SIM 236 encompasses subscriber identification and security information stored in a memory system (not shown) of the private UE 230. This latter version has the advantage of enabling the SIM 236 to be downloaded from the WLAN 228 along with computer software or programs that enable the private UE 230 to emulate or function as a communication terminal. Such emulator programs are described in greater detail in commonly assigned, co-pending U.S. patent application Ser. No. 10/155,931, which is incorporated herein by reference.

In yet another embodiment, the private network 220 further includes an identity module 238 coupled to the NIB 224, and having at least one identifier or virtual identifier stored therein that can be permanently or temporarily associated with one or more private UEs 230, to enable the private UE to communicate with the public network 102 and/or the private cellular network 222 via the WLAN 228. Identity modules and virtual identifiers and described in greater detail in commonly assigned, co-pending U.S. patent application Ser. No. 10/002, 551, filed Nov. 1, 2001, which is incorporated herein by reference. Generally, the virtual identifiers include algorithms and a key to support authentication and encryption necessary to facilitate communication with the public network 102 or private cellular network 222. In one version of this embodiment, the identity module 238 includes subscriber identification and security information stored in a memory system (not shown) coupled to the NIB 224. Alternatively, the identity module 138 includes a card holder/reader (not shown), as described above, and the virtual identifiers include one or more GSM-type SIM cards or 3G-type USIM cards held in the card holder/reader), as described above.

The virtual identifiers can be associated with the private UEs 230 on a one-to-one basis; on a one-to-many basis; or on a many-to-many basis in which the virtual identifiers are maintained as a pool of virtual identifiers that are associated temporarily with a private UE on an as needed basis. Alternatively, the virtual identifiers can be associated with the private UEs 230 on a many-to-one basis to provide a single private UE with multiple different user profiles that can be selected by a user for record or billing purposes. For example, a user placing a call from a private UE 130 over the public cellular network 204 could enter a first code selecting a first user profile when the call is for business purposes, and a second when the call is for private purposes. In addition, the communication system 200 or the user can select a GSM-type SIM identifier (virtual SIM) when the communication is over the GSM network 210, and a 3G-type USIM identifier (virtual USIM) when it is connected or routed over the 3G network 214.

Preferably, the SIM 234 or identity module 238, and programs or software in the private UE 230 that allow it to emulate a communication terminal, are also adapted to enable the private UE to control or access supplementary and/or value added services provided by the private cellular network 222 or public network 202 service provider. Supplementary services can include, for example, Voice Group Call Service; Voice Broadcast Service; Service definition Line Identification Supplementary Services; Call Forwarding Supplementary Services; Call Waiting and Call Hold Supplementary Services; multiparty Supplementary Services including call conferencing; Closed User Group Supplementary Services, Advice of Charge Supplementary Services; Call Barring Supplementary Services; Unstructured Supplementary Service Data; Explicit Call Transfer; Completion of Calls to Busy Subscriber; Short Message Service; and Follow Me. Value added services include, for example, e-mail, calendar, and wireless inventory, etcetera.

The WLAN 228 can include one or more separate and discrete networks each using one of a number of different protocols including IEEE 802.11 standards (802.11), and ETSI standards for BRAN, such HiperLAN or HiperMAN. These standards serve to ensure the interoperability of wireless communications equipment operating in the same spectrum but manufactured by different manufacturers. In particular, BRAN is a set of communication standards for Broadband Radio Access Networks developed by ETSI in response to growing market pressure for low-cost, high capacity radio link, and is used chiefly in European countries. BRAN provides broadband wireless access at a rate of 25 Mbit/s or more to networks or WLANs operating in either licensed or license exempt spectrum. IEEE 802.11 standards are a similar set of WLAN standards. There are two types of HiperLAN: (i) HiperLAN/1, which provides communications at up to about 20 Megabytes Per Second (Mbps) in the 5 GHz band; and (ii) HiperLAN/2, which provides communications at up to 54 Mbps in the same band. HiperMAN is a similar standard used for systems serving a metropolitan area. Although, HiperMAN is generally used in larger communication systems that could be defined as a wireless metropolitan area network, rather than a WLAN, it will be appreciated that the principles of the present invention can be applied to such a communication system. Accordingly, it will be understood that as used herein the term WLAN refers to both wireless local area networks and a wireless metropolitan area networks. IEEE 802.11 refers to a line of related specifications or standards developed by the IEEE for wireless communication, including 802.11, 802.11a, 802.11b, 802.11g and 802.1x. 802.11 is similar to HiperLAN and applies to WLANs having from 1 or 2 Mbps transmission rates in the 2.4 GHz band using either frequency hopping spread spectrum (FHSS) or direct sequence spread spectrum (DSSS). 802.11a is an extension to 802.11 that applies to WLANs, provides up to 54 Mbps in the 5 GHz band, and uses an orthogonal frequency division multiplexing encoding scheme rather than FHSS or DSSS. 802.11b, also known as 802.11 High Rate or WiFi, is another extension that provides up to 11 Mbps transmission rates in the 2.4 GHz band, allowing wireless functionality comparable to Ethernet. Thus, 802.11b is particularly useful interfacing with or coupling to GPRS systems according to the present invention for wireless transmission of data. 802.11g applies to WLANs and provides greater than 20 Mbps in the 2.4 GHz band.

In still another embodiment, the WLAN 228 is further coupled to the Internet 208 through a firewall 240, to enable the private UE 230 to transfer video and audio data, and/or to transfer or download large files or attachments to or from other data processing systems or servers. Preferably, the private UE 230 is adapted to enable a user to simultaneously carry on communication, for example voice communication, with a telephone or terminal in the private cellular network 222 or public network 202, and communication, for example data communication, with a terminal coupled to the Internet 208. More preferably, the private UE 230 includes a computer program to simultaneously enable voice over an internet protocol network communication (VoIP), with a telephone or terminal (not shown) coupled to the Internet 208, WLAN 228, LAN 229 or another IP network. The VoIP program can include a standard VoIP program native to the private UE 230, which comes standard on many computers and portable computers, or a VoIP program included with computer software or programs downloaded from the WLAN 228, such as the virtual SIM or emulator program, as described above.

In still another embodiment, computers or terminals 242 coupled to the NIB 224, through the LAN 229, are also adapted to communicate voice and data with telephones or terminals in the public cellular network 204 and/or private cellular network 222 via the NIB 224 and the interface functions or links from the NIB to the public and private cellular networks 204, 222.

Figure 6:
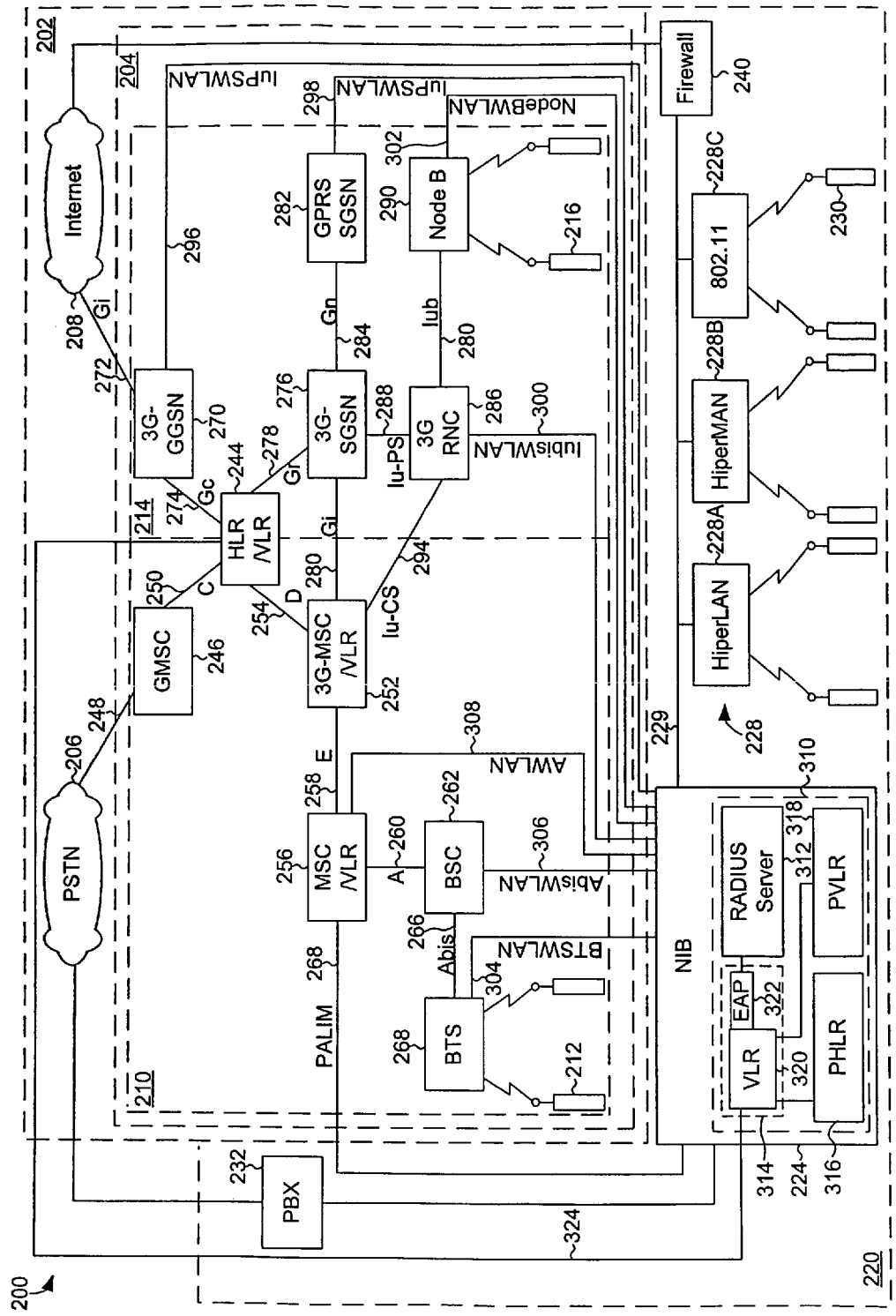
FIG. 6 is a block diagram of a communication system including a HiperLAN, HiperMAN, and 802.11 WLANs coupled to a private cellular network and a public network, and a Remote Authentication Dial In User Service (RADIUS) server coupling the WLAN to public and private home location registries (HLRs) according to an embodiment of the present invention.

An embodiment of the communication system 200 of the present invention will now be described in greater detail with reference to FIG. 6. Referring to FIG. 6, the public network 202 includes a public HLR/VLR 244 coupled to the GSM network 210 and the 3G-network 214. The public HLR of the HLR/VLR 244, can include, for example, a home location register and/or a home subscription sever HSS, and records and stores information relating to users or subscribers of the public network. The VLR of the HLR/VLR 244 maintains subscriber information for visitors or roamers to the cells or area served by the public cellular network 204. Generally, the HLR/VLR 244 also includes an authentication and accounting server or function (not shown) used by many service providers to authorize access to the public GSM network 210 and/or the public 3G-network 214.

The GSM network 210 includes a gateway mobile services switching center (GMSC 246) coupled to the PSTN 206 through a landline or trunk 248, and to the HLR/VLR 244 through a C interface or link 250. The GMSC 246 is a gateway switching center or exchange that directs or routes calls from the PSTN 206 to the MSs 212, and from the MS to the PSTN. A third generation mobile services switching center (3G-MSC 252) coupled to the HLR 244 through a D interface or link 254 provides switching services and co-ordination between mobile stations 212 in the GSM network 210 and public UEs 216 in the 3G network 214. Optionally, the 3G-MSC 252 also include another or second VLR to maintain subscriber information for visitors or roamers to the cells or area served by the 3G-MSC. The 3G-MSC 252 also couples to one or more MSCs 256, only one of which is shown, through an E interface or link 258. As with the 3G-MSC 252, the MSC 256 can also include a VLR to maintain subscriber information for visitors or roamers to the cell or area served by the MSC. The MSC 256 in turn couples through an A interface or link 260 to one or more BSC 262, each of which controls one or more BTS 264 through an Abis interface or link 266. The MSC 156 also couples to the private cellular network 222 through a private A-link intelligent multiplexor interface function or link (PALIM 268). PALIM functions or links are described detail in commonly assigned U.S. Pat.

Nos. 5,818,824, 5,734,699, 5,999,813 and 6,212,395, all of which are incorporated herein by reference.

In the embodiment shown, the 3G-network 214 includes a third-generation gateway GPRS support node (3G-GGSN 270) coupled to the Internet 208 through a Gi interface or link 272, and to the HLR 244 through a Gc interface or link 274. The 3G-GGSN 270 provides an interface between the 3G cellular network 214 and an IP network, such as the Internet 208. A third generation serving GPRS support node (3G-SGSN 276) coupled to the HLR 244 through a Gr interface or link 278 and to the 3G-MSC 252 through a Gi link 280, handles data traffic in an area served by the 3G cellular network 214. Optionally, the 3G-SGSN 276 is further coupled to a local, second generation (2G) or GPRS SGSN 282 through a Gn interface or link 284 to provide an interface between the 3G cellular network 214 and the WLAN 228. The 3G-SGSN 276 also couples to one or more 3G radio network controllers (3G-RNC 286), only one of which is shown, through an Iu-PS interface or link 288. Each 3G-RNC 286 controls one or more Node Bs 190 through an Iub interface or link 292. The 3G-RNC 286 also couples to the 3G-MSC 252 through an Iu-CS interface or link 294 to provide communication between the public UEs 216 and the MSs 212 of the GSM network 210 or telephones (not shown) connected to the PSTN 206.

As shown in FIG. 6, and as noted above, the WLAN 228 can include one or more separate and discrete networks or access points 228A, 228B, 228C, each using a number of different protocols including HiperLAN, HiperMAN and 802.11, as described above. The particular network or protocol used in the WLAN 228 can be selected based on factors including cost, desired bandwidth or bit-rate, or required range, frequency and regulatory limitations. For example, a communication system 200 in Europe or other states or nations adopting the HiperLAN standards might use the HiperLAN/1 or HiperLAN/2 standard depending on the desired bit-rate, while systems in the United States might use one of the 802.11 standards. Communication systems 100 serving a metropolitan area or requiring a higher capacity or bandwidth might use the HiperMAN standard.

As also shown in FIG. 6, the WLAN 228 can be coupled to the Internet 208 and to a number of different components in the GSM network 210 and/or the 3G-network 214. For example, in the 3G-network 214 the WLAN 228 can be coupled to the 3G-GGSN 270 through the NIB 224 and via an IuPSWLAN interface or link 296, the GPRS SGSN 282 via an IuPSWLAN interface or link 298, the 3G-RNC 186 via an IubisWLAN interface or link 300, and/or to one or more Node Bs 290 via a NodeBWLAN interface or link 302. In the GSM network 110 the WLAN 228 can be coupled to the BTS 268 via a BTSWLAN interface or link 304, to the BSC 262 via an AbisWLAN interface or link 306, and/or to the MSC 256 via an AWLAN interface or link 308. In addition, the WLAN 228 can be coupled to the MSC 256 through the NIB 224 and over the PALIM link 268, described above.

It will be understood that where the WLAN 228 includes multiple separate networks or access points 228A, 228B, 228C, which may or may not use different protocols, each of the separate access points can be coupled through the NIB 224 to different components in the public network 202. For example, it might be desirable to couple an access point 228C using an 802.11b standard for high speed transmission of data to the GPRS SGSN 282.

In yet another embodiment, the communication system 200 further includes a Remote Authentication Dial In User Service (RADIUS) system 310, having a RADIUS authentication and accounting gateway or server 312. The RADIUS system can be combined with the NIB 224, as shown, or can comprise a standalone RADIUS server 312 separate and distinct from the NIB. RADIUS is an authentication and accounting system used by many service providers to authorize access to a communication system. Though not an official standard, the RADIUS specification is maintained by a working group of the Internet Engineering Task Force (IETF). Generally, RADIUS requires users to enter a username and password, which is passed to the RADIUS server 312 to check that the information is correct, and authorize access to the communication system 200. A separate authentication/authorization server (not shown in this figure) within the RADIUS system 310 or coupled to the RADIUS server 312 provides or supports roaming capabilities for the private UEs 230 among the plurality of access points 228A, 228B, 228C and the public cellular network 204. Additionally, the RADIUS server 312 receives accounting packets or call detail records (CDRs) generated by the different access points 228A, 228B, 228C, and forwards these accounting packets to a billing server (not shown) through a RADIUS proxy interface (not shown) to bill telecommunications charges to the appropriate parties.

Preferably, the RADIUS server 312 is coupled via a VRAD 314 to the public HLR/VLR 244 and, to a private HLR (PHLR 316) and/or private VLR (PVLR 318). The VRAD 314, private HLR 316 and private VLR 318 can be combined with the RADIUS system 310, as shown, or can comprise a standalone server separate and distinct from the RADIUS system. For example the VRAD 314, private HLR 316 and private VLR 318 can be combined with the NIB 224, and the system 310 or server 312 can be separate and distinct from the NIB 224, as described above. The private HLR 316 is stores information on UEs 230 registered or subscribing to the communication system 200, and more particularly to the WLAN 228 and/or the private cellular network 222. The private VLR 318 is capable of temporarily storing information on subscribers or UEs 230 considered as roaming within the service area of the WLAN 228. The VRAD 314 is a VLR-RADIUS interface, and includes an internal integral VLR 320 and an extensible authentication protocol (EAP) interface 322 for signaling to the public HLR/VLR 244 and the private HLR 316. The RADIUS server 312 couples to the public HLR/VLR 244 via an EAP over RADIUS link (EAP/RADIUS Link 324). The RADIUS server 312 further couples to the public HLR/VLR 144 via the LAN 229 and the Internet 208 over an EAP over SIM link (not shown in this figure) for transmission of data. The RADIUS server 312 couples to one or more access points 228A, 228B, 228C, via the NIB 224 and the LAN 229.

The RADIUS server 312 supports roaming of private UEs 230 based on a RADIUS/DIAMETER roaming model along with traditional GSM subscriber roaming based upon the mobile application part (MAP) standard for address registration of roamers and inter-system hand-off procedures. Part of the SS7 protocol used in GSM, MAP standardizes address registration of roamers and inter-system hand-off procedures. In case of a communication system 200 having a number of private cellular networks 222, each with an associated WLAN 228 and linked by a PWAN (not shown), the RADIUS server 312 can act as a proxy to forward an authentication request via the VRAD 314 to a single, central public HLR/VLR 244 and/or a single, central private HLR 316 Alternatively, where the communication system 100 includes either a distributed public HLR/VLR 244 and/or a distributed private HLR 316, the RADIUS server 312 routes an interpretation of either a username or a user identity provided in the authentication procedure, to the appropriate public or private HLR. In one version of this embodiment, the RADIUS server 312 is enhanced to contact the appropriate or controlling public or private HLR 244, 314, either by: (i) querying a standalone Central Address Table server (not shown) coupled thereto to match International Mobile Subscriber Identity (IMSI) information provided in the authentication procedure to the corresponding HLR; or (ii) using a configuration table that matches the IMSI ranges with the appropriate or controlling public or private HLR. This last model works well if IMSI partitioning is implicitly or explicitly enabled for subscriber provisioning across multiple public or private HLR 244, 316.

Moreover, because the location of the private UEs 230 become known in the RADIUS server 312 and/or the VLR 320 during the authentication or registration process, the communication system 200 of the present invention has the ability to build or provide services based on location or location based services.

Figure 7:
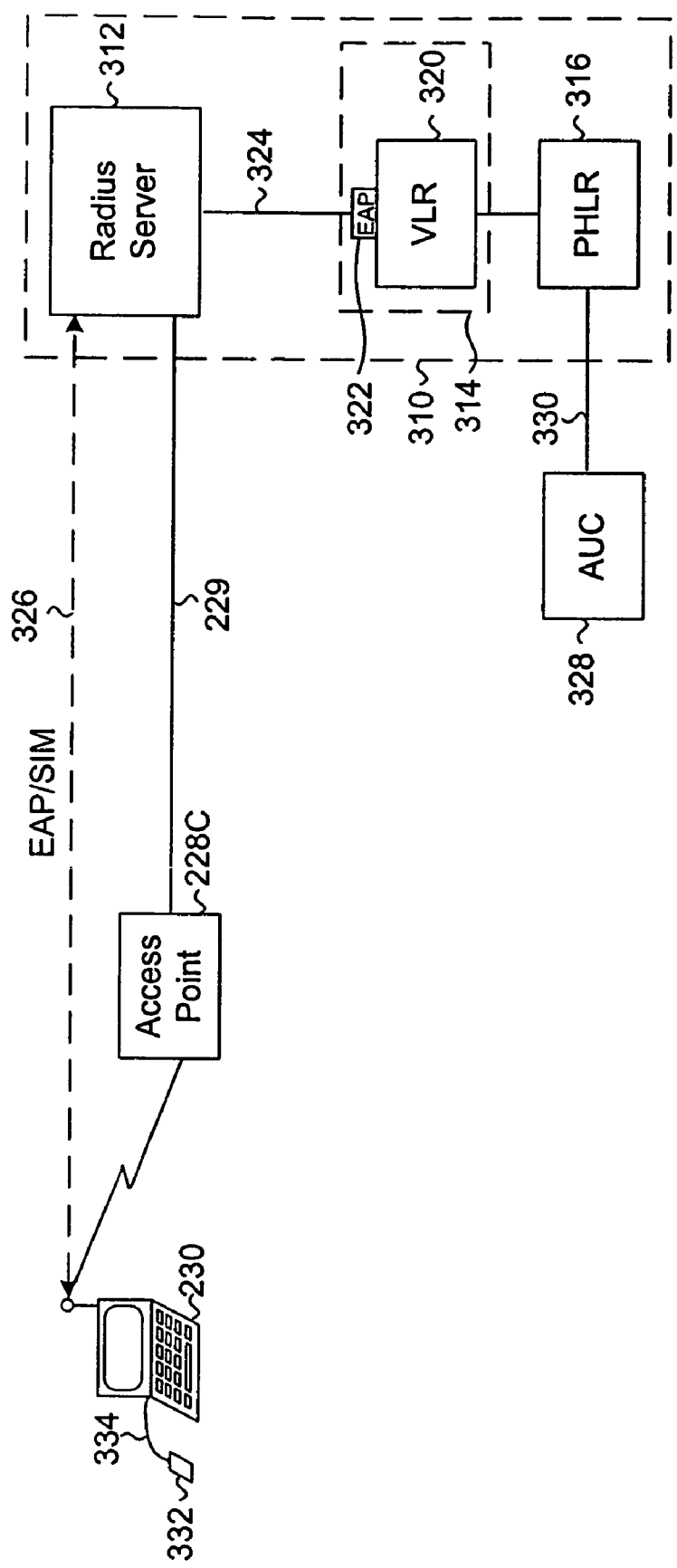
FIG. 7 is a block diagram of a portion of the communication system of FIG. 6 illustrating the coupling of the RADIUS server to an access point, a user equipment terminal (UE), and the private HLR, according to an embodiment of the present invention.

Coupling between the private UEs 230 and the RADIUS server 312, and between the RADIUS server and the public or private HLR 244, 316, can be seen more clearly in FIG. 7. Referring to FIG. 7, the access point 228C couples to the RADIUS server 312 via the LAN 229 or via a separate radio link (not shown) and via an EAP/SIM Link 326, and to the private HLR 316 via EAP/RADIUS link 324. In an alternative to the embodiment shown in FIG. 6, the authentication/authorization can be handled by a separate authentication/authorization server 328 coupled to the private HLR 316 via a proprietary link 330, as shown. As indicated previously and as shown in FIG. 7, the private UE 230 must provide authentication information in a manner similar to a GSM MS 212. Generally, this there are three different ways or methods of accomplishing this, including: (i) use of a universal serial bus (USB) adapter 332 that enables the private UE 230 to communicate with a GSM-type SIM card or a 3G-type USIM card via a USB bus 334; (ii) use of a PCMCIA adapter (not shown) that enables the private UE 230 to communicate directly with a GSM-type SIM card; or (iii) use of a virtual SIM as described briefly above and in greater detail in U.S. patent application Ser. No. 10/002,551.

Figure 8:
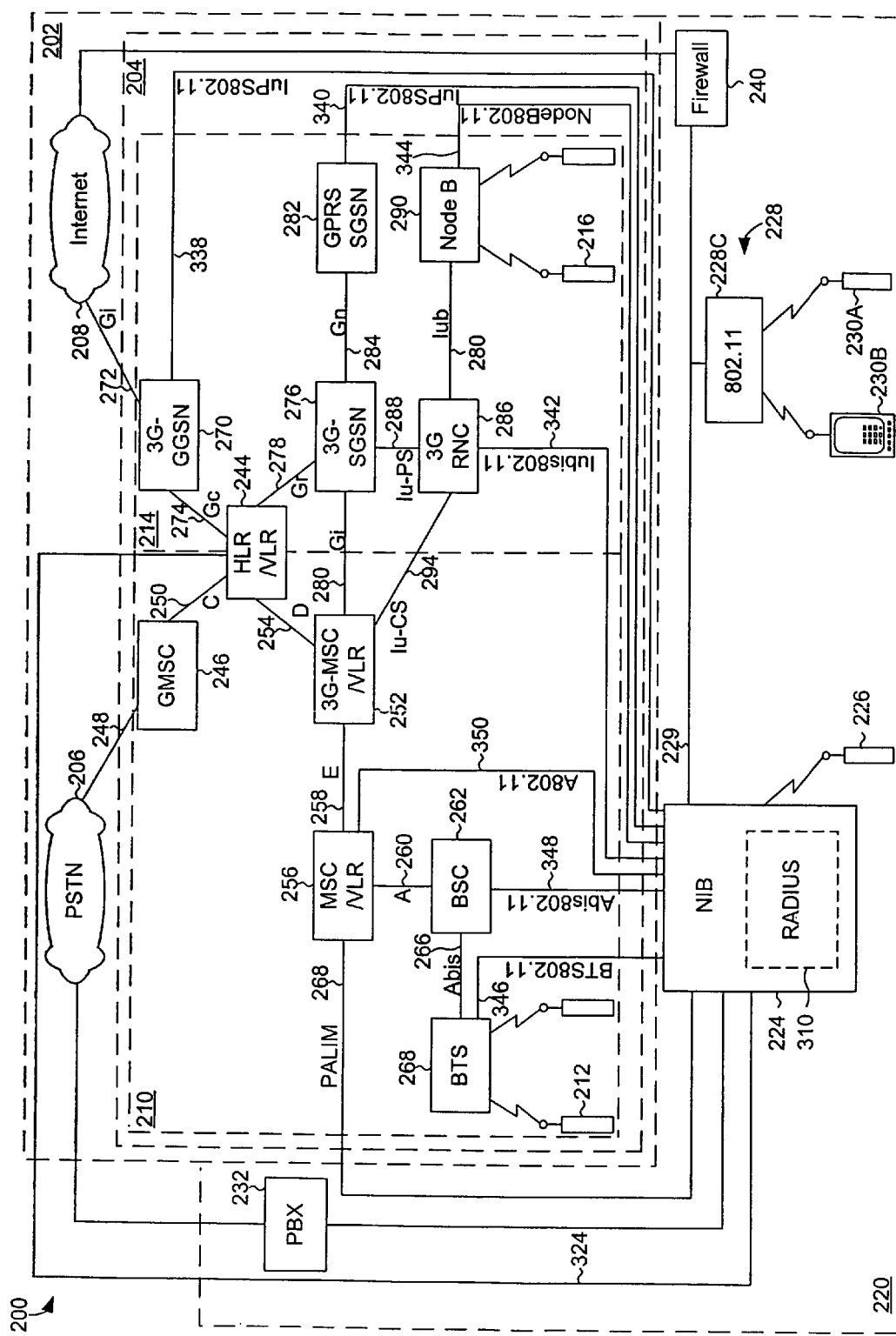
FIG. 8 is a block diagram of a communication system including an 802.11 WLAN coupled to a private cellular network and a public network, and a RADIUS server according to an embodiment of the present invention.

A preferred embodiment in which the WLAN 128 includes an 802.11 network will now be described with reference to FIG. 8. Referring to FIG. 8, the public cellular network 104 includes a GSM network 110 and a 3G-network 314, as described above. The WLAN 228 includes an 802.11 network having one or more 802.11 access points 336 (only one of which is shown), and adapted in accordance with the present invention to couple communication between the private UEs 230 and the public network 202 and/or private cellular network 222. The private UEs 230 can include voice communication devices 230A, such as wireless telephones or mobile stations, and data communication devices 230C, such as pagers, facsimile machines, portable computers, network access appliances and personal digital assistants (PDAs).

In the 3G-network 214 the 802.11 access point 228C is coupled to the 3G-GGSN 270 through the NIB 224 and via an IuPS802.11 interface or link 338, the GPRS SGSN 282 through the NIB and via an IuPS802.11 interface or link 340, the 3G-RNC 286 through the NIB 224 and via an Iubis802.11 interface or link 342, and/or to one or more Node Bs 290 through the NIB 224 and via a NodeB802.11 interface or link 344 In the GSM network 210 the 802.11 access point 228C can be coupled to the BTS 268 through the NIB 224 and via a BTS802.11 interface or link 346, to the BSC 262 through the NIB 224 and via an Abis802.11 interface or link 348, and/or to the MSC 226 through the NIB 224 and via an A802.11 interface or link 350 In addition, the WLAN 228 can be coupled to the MSC 256 through the NIB 224 and over the PALIM link 268, described above.

Figure 9:
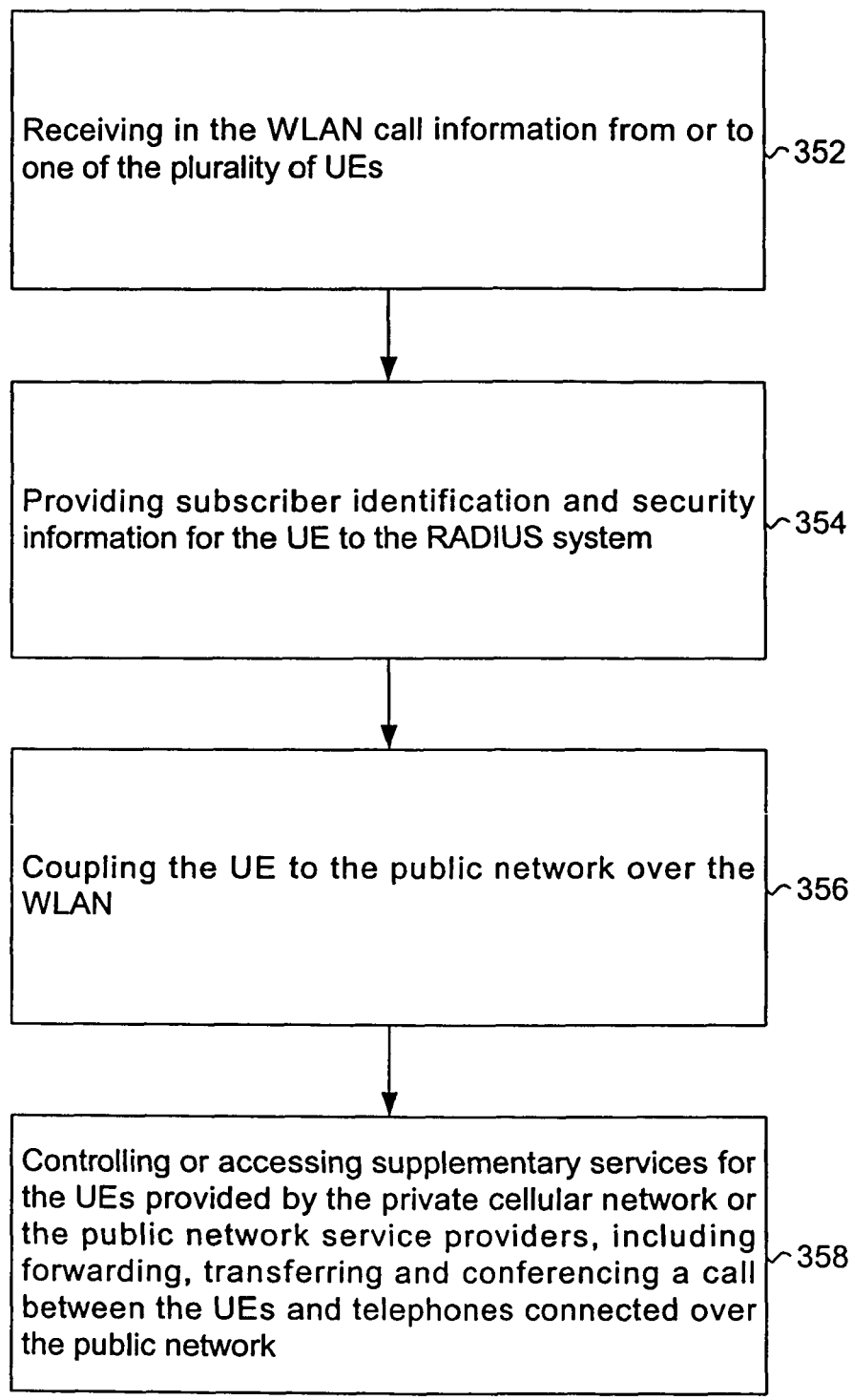
FIG. 9 is a flowchart showing an embodiment of a process for enabling UEs to communicate with a private cellular network and a public network via a WLAN according to an embodiment of the present invention.

A method or process for operating communication system 100 according to an embodiment of the present invention will now be described with reference to FIG. 9. FIG. 9 is a flowchart showing steps of a method for facilitating communication between private UEs 230 and the public network 202 via a WLAN 228. In the method, call information from or to one of a number of private UEs 230 is received in the WLAN 228 (step 352). Subscriber identification and security information for the private UE 230 is provided to the RADIUS system 310 (step 354), and the private UE is coupled to the public network over the WLAN (step 356). In one preferred embodiment, the communication between the private UEs 230 and the public network 202 is voice communication, and the method further includes the step of controlling or accessing supplementary services for the UE provided by the private cellular network 222 or public network 202 service provider (step 358).

As noted above, the subscriber identification and security information can be provided from a 3G-type USIM or GSM-type SIM 236 associated with each private UE 230, or from an identity module 238 in the private cellular network 222. Moreover, where the identity module 238 of the communication system 200 includes a memory system (not shown) having subscriber identification and security information stored therein, and the step of providing subscriber identification and security information for the private UE 230 to the RADIUS system 310, step 354, is accomplished by providing subscriber identification and security information associated with the private UE from the memory system. Alternatively, where the communication system 200 further includes a card holder/reader holding a number of cards associated with the private UEs 232, and step 354 involves reading subscriber identification and security information stored in one of the number of cards held in the card holder/reader.

Certain exemplary embodiments of a communication system according to the present invention, their uses and advantages will now be described with reference to FIGS. 10 to 16.

Figure 10:
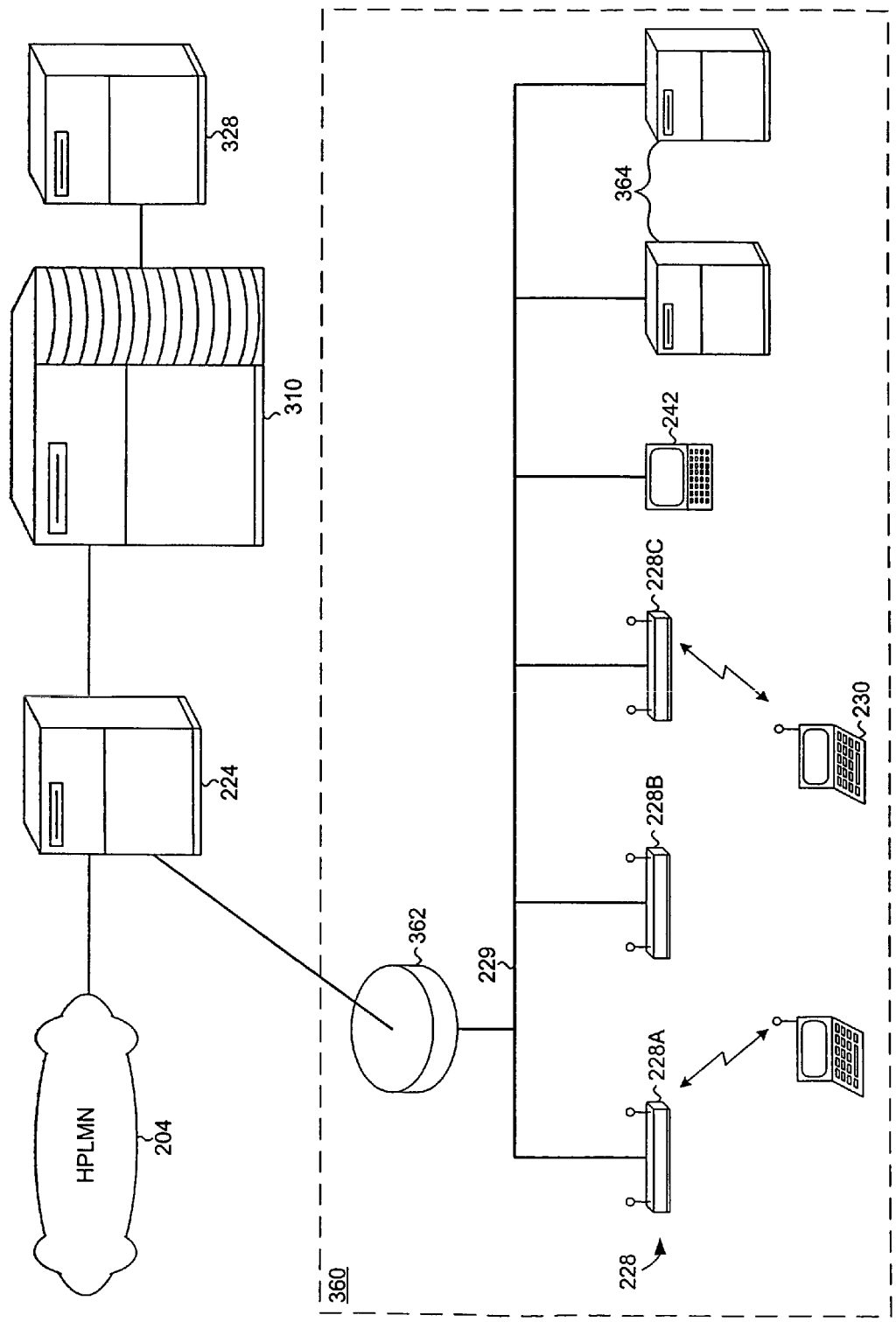
FIG. 10 is a block diagram of a communication system including a corporate LAN coupled to the public network through a WLAN according to an embodiment of the present invention.

FIG. 10 is a block diagram of an embodiment of a communication system 200 having a private corporate LAN 360 including a WLAN 228 according to the present invention, coupled to a public cellular network 204, such as a home public land mobile network (HPLMN), a RADIUS system 310 and an authentication server 328. Generally in this embodiment, the corporate LAN 360 includes, in addition to the WLAN 228, a hub or router 362 coupled through a wired LAN 329 to a number of access points 228A, 228B, 228C, in the WLAN and to other terminals, such as computer terminals 342 or servers 364. As described above, the RADIUS system 310 includes a RADIUS server or gateway for authorizing access to the communication system 200, and a private HLR (not shown in this figure). The authentication server 328 provides or supports roaming capabilities for the private UEs 230 among the plurality of access points 328A, 328B, 228C and the public cellular network 204. The RADIUS system 310 communicates with the authentication server 328 to obtain user credentials and a ciphering key to enable true GSM-type authentication. Preferably, to provide sufficient level of security in the communication system 200 the authentication server 328 uses a GSM A3/A8 algorithm for key generation. In accordance with the present invention, users of UEs 230 can access data in the servers 364, while simultaneously communicating with one another or with other terminals or telephones coupled to the public cellular network 204. This embodiment provides a central private HLR (not shown in this figure) in the RADIUS system 310 to centralize operation and management (OAM) functions, and to minimize the changes necessary to the WLAN 228 to access or control supplementary or value added services and communication with the public cellular network 204 for the private UEs 230. Preferably, the private HLR is able to handle or serve at least about 100,000 mobile stations, UEs 230 or users, and the authentication server 328 at least about 200,000, making this embodiment particularly suitable for use in airports, hotels, convention centers, etcetera.

Figure 11:
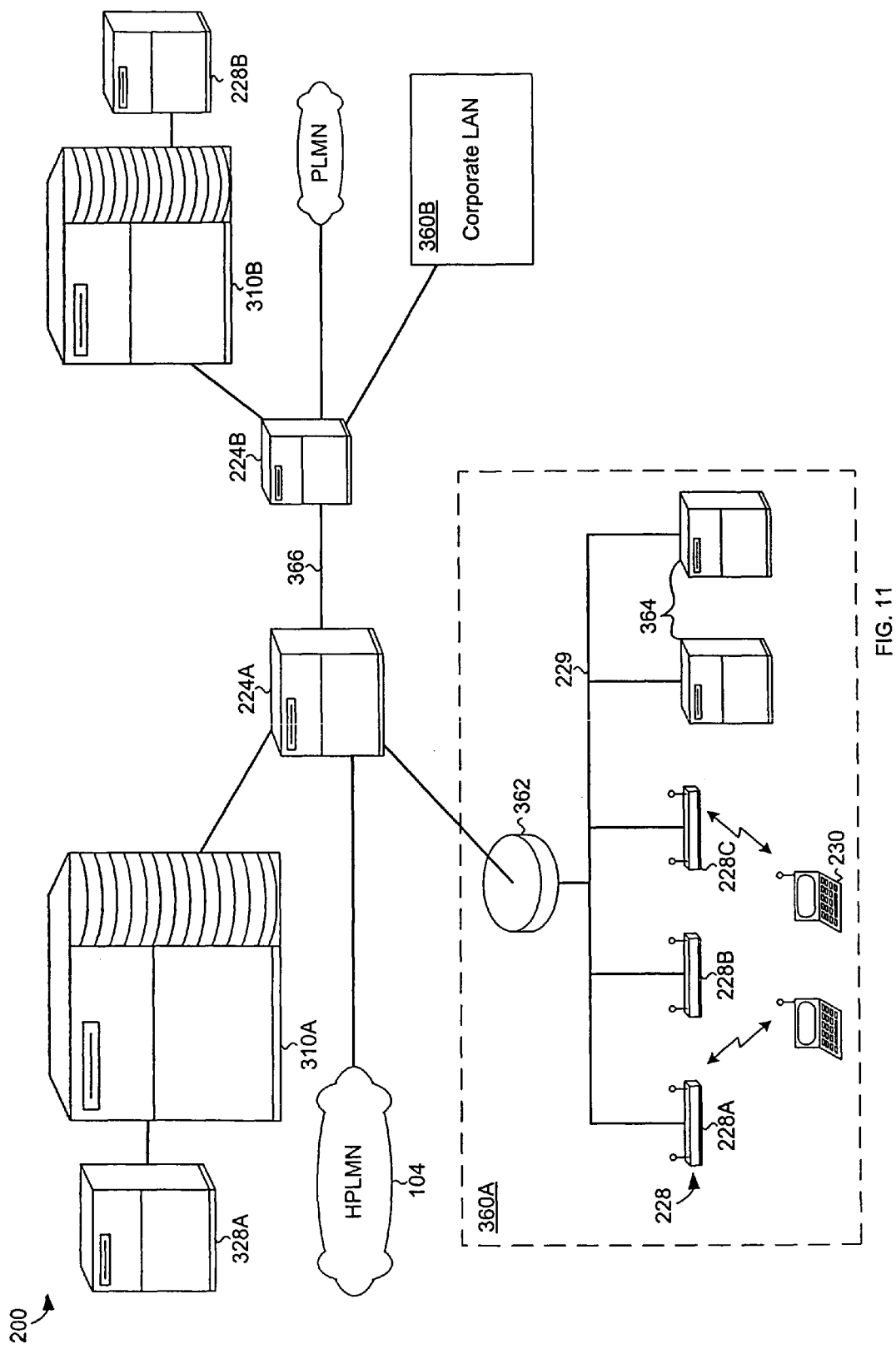
FIG. 11 is a block diagram of an alternative embodiment of the communication system of FIG. 10, having multiple RADIUS servers, authentication servers and clients according to the present invention.

FIG. 11 is a block diagram of an alternative embodiment of the communication system of FIG. 10, having a number of RADIUS systems 310A, 310B or private HLRs and authentication servers 328A, 328B, and NIBs 224A, 224B, linked by a PWAN 366 for distributing HLR registration and authentication loads. This embodiment is particularly suitable for use in enterprises operating a number of different WLANs 228 or corporate LANs 360A, 360B, at a number of different sites. For example, a chain of hotels, recreational parks or business centers owned and/or operated by a single enterprise.

Figure 12:
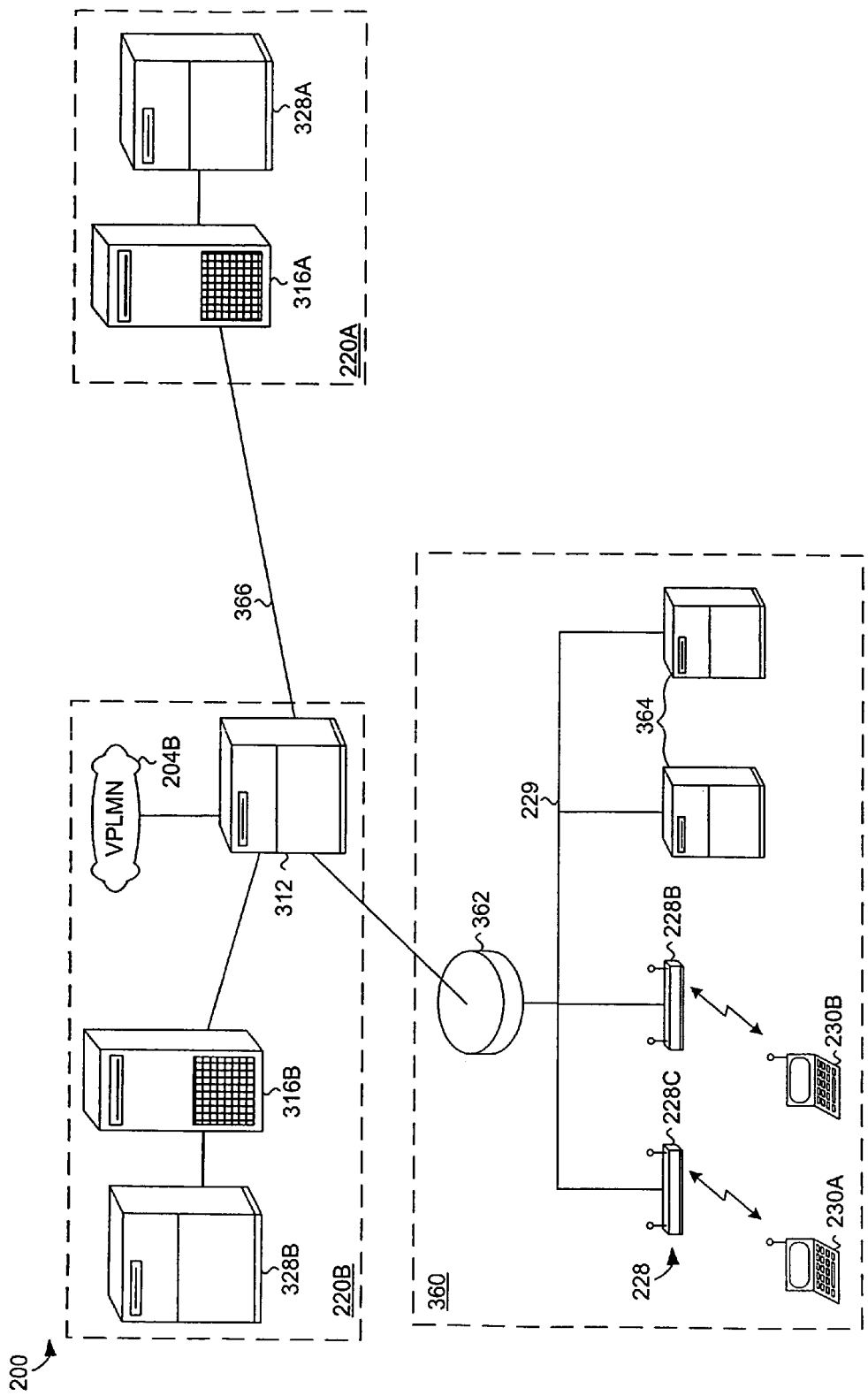
FIG. 12 is a block diagram of an embodiment of a communication system having distributed private HLR and authentication server according to the present invention for enabling roaming of UEs.

FIG. 12 is a block diagram of yet another alternative embodiment of the communication system of FIG. 10 illustrating roaming of 802.11 or GPRS enabled UEs 230 between a coupled to a home private network 220B, and a visited private network 220B coupled to a visited public cellular network 204B or visited public land mobile network (VPLMN). Referring to FIG. 12 a visiting private UE 230A to an area served by the corporate LAN 260 is able to communicate with another UE 2130B home private network 220A and terminals or servers 364 in the corporate LAN 360 and with terminals in the public network 202 through the local or visited public cellular network 204B and the corporate LAN. To authenticate the UE 230A and authorize access to the communication system 200, RADIUS messages are passed from the visiting UE 230A through the router 360 to a NIB (not shown in this figure) or a RADIUS gateway or server 312 in the visited private network 220B. The RADIUS server 312 determines subscriber information for the visiting UE 230A is not stored in private HLR 216B but in a private HLR 316A in the home private network 220A. RADIUS messages are then passed from the RADIUS server 312 over the PWAN 366 to the private HLR 316A and an authentication server 328A in the home private network 220A of the visiting UE 230A. Note, in this embodiment each of the distributed private HLRs 316A, 316B, can be smaller, and able to handle fewer mobile stations, UEs 230 or users than the HLR in the embodiments described above.

Figure 13:
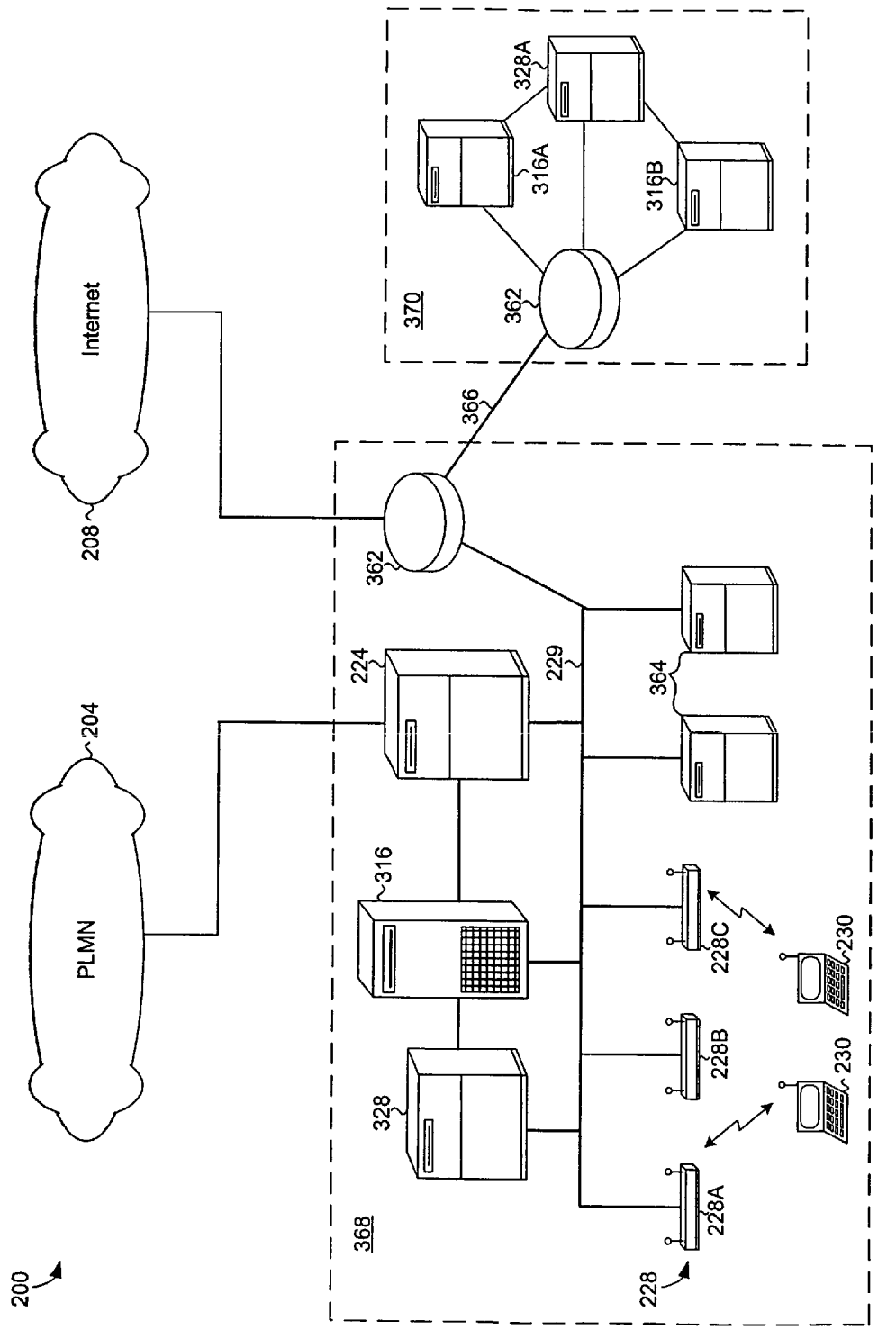
FIG. 13 is a block diagram of yet another embodiment of a communication system including multiple corporate LANs according to the present invention.

FIG. 13 is a block diagram of yet another embodiment of a communication system 200 according to the present invention, which is particularly suitable for use in airports, hotels, convention centers, etcetera. In this embodiment, a private network or corporate LAN 360 including a RADIUS server 312, a private HLR 316, an authentication server 328, a WLAN 228, and a LAN 229 coupling to servers 364 and access points 228A, 228B, 228C, of the WLAN are maintained at a first corporate site or location 368. The private network 220 at the first location 368 is coupled through a router 362 to the Internet 208 and, through a PWAN 366 to additional private HLRs 316A, 316B and authentication servers 328A, at additional corporate locations 370. This embodiment provides a distributed HLR and authentication servers, while centralizing OAM functions within the PWAN 366, and providing value added services for the private cellular network 222, and minimizing the changes necessary to the corporate LAN 360 to enable communication with the public cellular network (not shown in this figure). Preferably, each of the smaller distributed HLRs 316, 316A, 316B and authentication servers 328, 328A are able to handle or serve at least about 8,000 mobile stations, UEs 230 or users.

Figure 14:
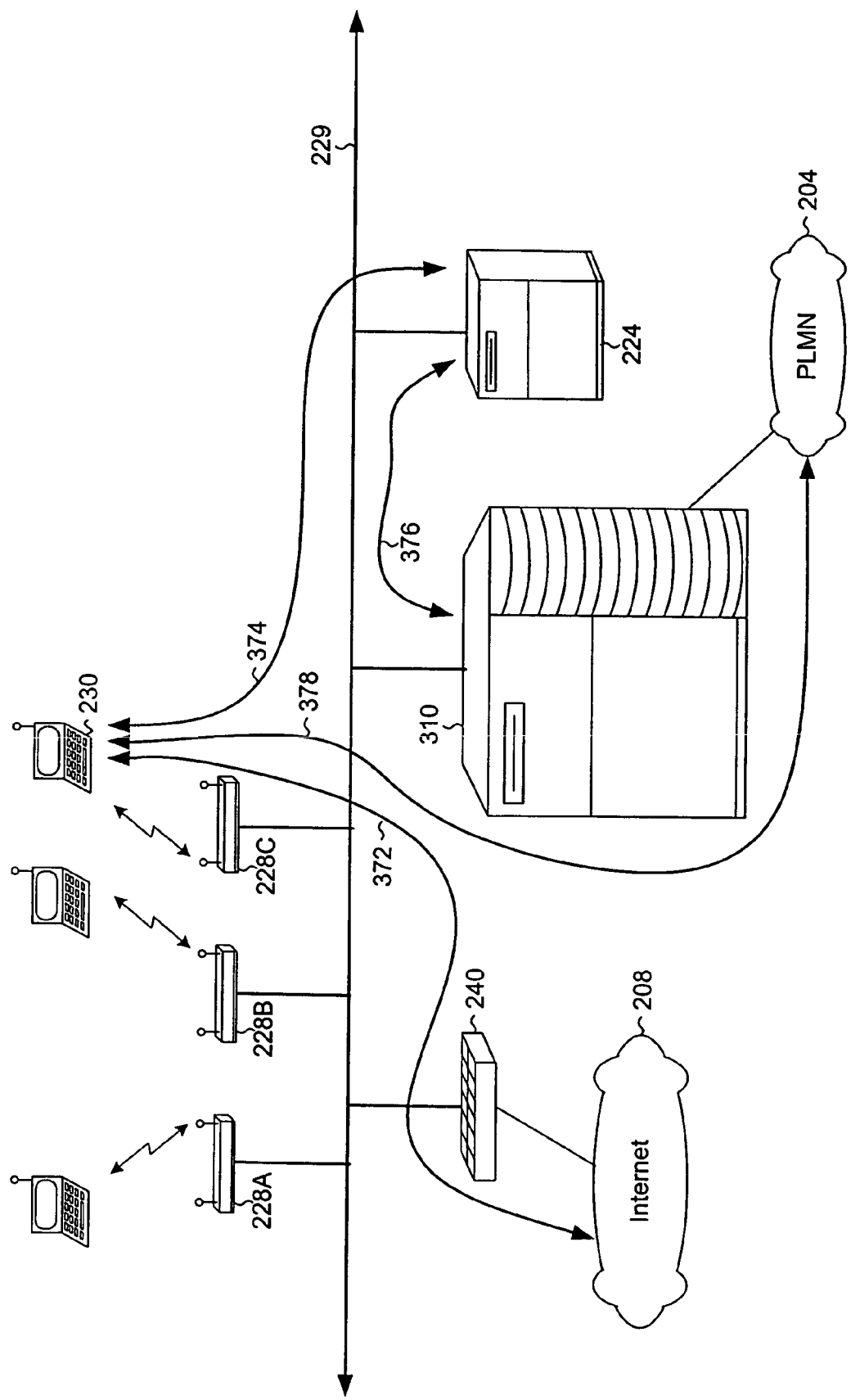
FIG. 14 is a block diagram showing communication routing in a communication system including a WLAN and a RADIUS server according to the present invention.

FIG. 14 is a block diagram showing communication routing in a communication system 200 including a WLAN 228 and RADIUS system according to the present invention. Referring to FIG. 14, arrow 372 shows the data path for user data from a UE 230 to an IP network, such as the Internet 208, through an access point 228C of the WLAN 228, LAN 229, and a firewall 240. In accordance with the present invention, the same or additional UEs 230 simultaneously couple to the public cellular network 204 or PLMN through the RADIUS system 310 as shown by arrows 374, 376, and 378. In particular, arrows 374 and 376 show a signaling path over which RADIUS messages are passed to identify the UE 230 and authorize access to the communication system 200. Arrow 378 shows the path of user data over which data, including voice, graphics or images, and other data is passed between the UE 230 and the public cellular network 204.

Figure 15:
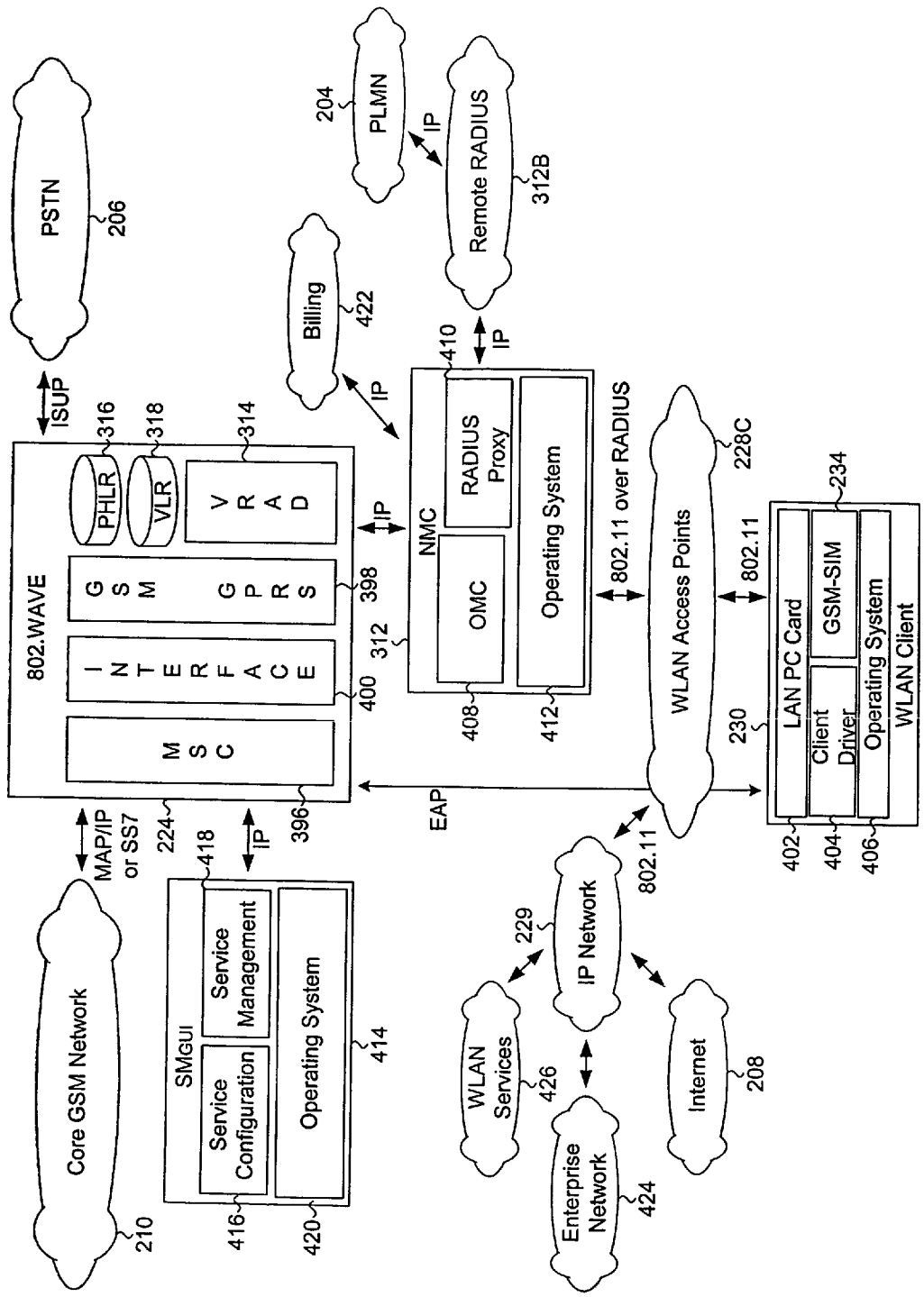
FIG. 15 is a block diagram showing an embodiment of architecture of a communication system according to the present invention.

FIG. 15 is a block diagram of yet another embodiment of a communication system 200 showing an architecture of the communication system according to the present invention. Referring to FIG. 15 the core element of the communication system 200 is the NIB 224, which combines an MSC 396, a GSM/GPRS radio 398, a private HLR 316 and private VLR 318. The MSC 396 couples to the GSM/GPRS radio 398 through an interface 400, and to the private HLR 316 and private VLR 318 through a VRAD interface 322. The NIB 224 couples to a WLAN access points 228C through an EAP link, thereby enabling the NIB to full functional GSM/GPRS cellular capabilities as well as extending GSM/GPRS type security and roaming capabilities to UEs 230 over the WLAN 228. WLAN clients or UEs 230 capable of accessing the services provided through the NIB 224, generally include a LAN PC card 402 to enable wireless access, a GSM-type SIM 234, a client software or driver 404 to enable the UE to emulate a communication terminal and/or to control supplementary service provided by the communication system 200, and an underlying operating system 406.

The NIB 224 couples to a network management center (NMC) or RADIUS server 312 through the VRAD 322. In the embodiment shown, the RADIUS server 312 includes an operations maintenance center (OMC 408), RADIUS proxy function 410, and an underlying operating system 412. The RADIUS server 312 also couples to the WLAN access points 228C through an 802.11 over RADIUS link, thereby enabling the RADIUS server to authorize and control access to the communication system 200.

The NIB 224 also couples to a subscriber management graphical user interface (SMGUI 414) to allow management of the communication system 200 and the subscriber profiles maintained in the private HLR 316 and private VLR 318. The SMGUI 414 generally includes a service configuration function 416 for management of communication system configuration, a service management function 418 for management of subscriber profiles, and an underlying operating system 420.

The RADIUS server 312 couples via an IP network or link to other remote RADIUS servers 312B, and through the remote RADIUS servers to other GSM networks or PLMN 204. The RADIUS server 312 couples via an IP network or link to a billing server 422 or service. This particularly useful for forwarding billing information on roaming or visiting UEs 230.

The WLAN access points 228C are further coupled to an IP network, such as LAN 229, and through the LAN to the Internet 208, an enterprise network 424, and various WLAN services 426.

Some of the important aspects of the present invention will now be repeated to further emphasize their structure, function and advantages.

It will be appreciated that WLAN standards, such as IEEE 802.1X, HiperLAN/1 or HiperLAN/2, HiperMAN, and BRAN, can be used to derive authentication and encryption keys for use with any cipher, and can also be used to periodically refresh keys and re-authenticate so as to make sure that the keying material is fresh. These standards do not specify a single authentication method; rather they utilize Extensible Authentication Protocol (EAP) as its authentication framework. This allows WLAN enabled access points 228 to support a wide range of authentication methods, including certificate-based authentication, smartcards, token cards, one-time and passwords. Moreover, since switches and access points 228A, 228B, 228C, act as a pass-through for EAP, new authentication methods can be added without the need to upgrade the switch or access point, by adding software on the host and back-end authentication server 328.

A major advantage of using an WLAN based authentication scheme is that the access control capability is built into each access point 228A, 228B, 228C. An 802.11 enabled access point 228A, 228B, 228C, can directly communicate with a RADIUS system 310 or server 312 to authenticate a user or UE 230 and generate encryption key for the session. The access point 228A, 228B, 228C, can also store billing records for the subscriber and transfer them to the RADIUS system 310 using the RADIUS accounting protocol. The WLAN 228 based approach can be used to provide access to the Internet 208 in both wired LANs 229 as well as WLANs 228 operated by a service provider. Also, the client part of the network can be greatly simplified by using authentication functions for WLAN 228 based on WLANs built into many operating systems, such as the Windows XP® operating system, commercially available from Microsoft, Inc.

Another advantage of a communication system 200 according to the present invention is that the cellular service provider or service provider needs only to install a limited number of WLAN-enabled access points 228A, 228B, 228C, in the served areas, each access point directly communicating with a RADIUS system 310 or server 312. The use of EAP and WLAN-standards provides the required security in message exchange between the access point 228A, 228B, 228C, and the RADIUS system.

Yet another advantage is that EAP allows different authentication methods to be used by the authentication server 328 based upon configuration of the RADIUS system 310 and/or the authentication server. Thus, a cellular service provider can employ SIM based authentication to integrate 802.11 access information with a GSM user profile. A draft proposal outlining SIM based authentication using EAP, entitled EAP SIM authentication, is available from the Internet Engineering Task Force (IETF), and is incorporated herein by reference.

In one embodiment, an EAP interface 322 to a RADIUS server 312 is added to a VLR 320 in a NIB 224. This will allow authentication credentials to be exchanged between the WLAN 228 client UE 230 and a private HLR 316 following a GSM based authentication, encapsulated in EAP. The private HLR 316 will also be able to supply the access point 228A, 228B, 228C, with any user specific information, such as subscription profile, quality of service (QoS), etcetera, to enable any service differentiation.

In another embodiment, compact SIM card readers 332 which connect via a USB bus 334 to a UE 230, such as a personal computer (PC) or a laptop computer, can be used to support for SIM based authentication at client end. For example, an obtain/write interface layer between a WLAN driver of a Windows® based computer and the SIM card reader 332 allows authentication credentials to be generated and exchanged between the SIM and the access point 228A, 228B, 228C.

In still another embodiment, support for WLAN-session key generation can be accomplished using an algorithm similar to GSM ciphering key generation to ensure the WLAN solution offers a level of security close to that offered in GSM.

In yet another embodiment, inter-working capability between RADIUS based accounting and current GSM call data records or CDRs is accomplished by use of a separate accounting server (not shown). This accounting server receives the RADIUS accounting data from the access points 228A, 228B, 228C, converts the data into GSM based CDRs, for example, based upon subscriber profile, and transfers it to the billing entity using file transfer protocol (FTP).

In another embodiment, the communication system 200 according to the present invention has the ability to support roaming of WLAN 228 UEs 230 based upon a RADIUS/DIAMETER roaming model along with traditional GSM subscriber roaming based upon MAP. Requirements for different UEs 230, such as an 802.11 network access platform, include subscription to a WLAN service offered by a carrier. Generally, the user or subscriber would access the service provider's network through a WLAN enabled client device or UE 230, such as a laptop computer. Preferably, the client computer's operating system includes WLAN support, either natively or through additional drivers or an emulator program downloaded from the service provider, as described above. Two known operating systems satisfying this requirement are Microsoft Windows 2000® and Microsoft Windows XP®.

The UE 230 could authenticate in way similar to that of a GSM mobile station. There are several feasible methods of achieving this. In one method the UE 230 will need an authentication driver to interface with a GSM-type SIM card 234. This can be accomplished either through the use of a PCM-CIA adapter or a USB adapter 332 that provides the ability for the UE 230 to communicate with the GSM-type SIM card 234. A USB adapter 332 being more compact and reasonably priced than the PCMCIA adapter, it is the preferred interface. To emulate GSM authentication on the WLAN security framework, an EAP extension module or interface 322 is required. The EAP interface 322 will communicate with GSM-type SIM card 234 using an application programming interface (API), such as a PC Smartcard (PC/SC) interface, obtained from the service provider and plugged into the UE 230 as a dynamic linked library file (DLL).

The generation and use of session key for encryption of WLAN packets in conventional WLANs generally follows vendor specific interfaces. Thus, session key for encryption of WLAN packets depend on vendor specifications. In a preferred embodiment, in the communication system of the present invention the encryption key is generated based upon one or more ciphering key (Kc) generated during EAP/GSM authentication.

The access points 228A, 228B, 228C, required to work with the communication system 200 of the present invention must contain WLAN based authentication and session encryption support. The access point points 228A, 228B, 228C, will also be required to act as a RADIUS client to the RADIUS system 310 or server 312 and as a Network Access Server (NAS) in user authentication processes, causing EAP messages to be exchanged via RADIUS messaging. Two vendors offering access points 228A, 228B, 228C, meeting the above specifications include Proxim Inc., of Sunnyvale, Calif., and Cisco Inc., of San Jose, Calif.

In addition to the above, preferably the communication system 200 further includes a RADIUS server 312 capable of performing following functions:

- Interface with the access points 228A, 228B, 228C, for authentication of private UEs 230, through interpretation of either a Username field or a EAP User Identity field in the RADIUS authentication request 398.
- Route the authentication request to the appropriate authentication server 328.
- Act as a proxy to the public HLR/VLR 244 or to an external RADIUS system 310 or private HLR 316 if roaming is enabled, by routing of user authentication request to the appropriate HLR based upon information contained in the Username field.
- Where the public or private HLR 244, 316, is a central HLR, the RADIUS Server 212 will act as a proxy to forward authentication request to the HLR.
- Where the public or private HLR 244, 316, is a distributed HLR, the RADIUS Server 312 could be adapted to contact the correct HLR in either of the following ways:
  1. Query a standalone Central Address Table (CAT) Server (not shown) to match the HLR corresponding to subscriber IMS1; or
  2. Use a configuration table (not shown) that matches IMSI ranges of the UE 230 with the controlling HLR. (This model works if IMS1 partitioning is implicitly or explicitly enabled for subscriber provisioning across multiple HLRs)
- Receive RADIUS accounting packets generated by different access points 128A, 128B, 128C.
- Forward accounting packets to a billing server (not shown) through a EAP interface 222.
- Forward a copy of the accounting packets to the UE 230 home RADIUS server 312 or accounting server for the case of roaming subscribers.

Preferably, the RADIUS or private HLR 316 supports all of the following attributes or capabilities:

- Ability to enable/Disable WLAN 228 access for a particular UE 230, based upon subscriber IMSI.
- Ability to re-authenticate the subscriber with the WLAN 228 upon timer the session timer expiry at the access point 228A, 228B, 228C. (Session timeout value)
- Ability to use an algorithm to authenticate a subscriber to the WLAN 228. (Authentication algorithm)
- Ability to notify the user with an operator defined message with appropriate text whenever WLAN access or authentication is attempted. (Notification message)
- Ability to specify the maximum inactivity time after which the UE 230 will be assumed to wandered from out of the range of access point 228A, 228B, 228C, and removed from active user list. (Idle Timeout)
- Ability to specify the maximum number of consecutive failed authentication attempts before the UE 230 will be disabled from WLAN access. (Retry limit)

More preferably, the RADIUS or private HLR 316 of the communication system 200 will support following Read-only attributes:

- Ability to store information about the MAC address of the UE 230 used by the subscriber to access WLAN 228. (Calling Station Id)
- Ability to provide the date and time when last authentication attempt was made on WLAN 228. (Last Access Time)
- Ability to provide the date and time when last successful WLAN 228 authentication happened for the UE 230. (Last Successful access time)
- Ability to provide other miscellaneous connection information passed by the access point 228A, 228B, 228C, e.g., connected on 802.11b at 10 MBPS etc. (Connect Information)

As noted above, the RADIUS or private HLR 216 will communicate with the RADIUS server 312 using an EAP interface only. This will avoid use, creation and maintenance of a proprietary protocol between RADIUS server and the HLR. To support the EAP interface 322:

- An MD5 algorithm is implemented to verify the identity of the RADIUS server 312 acting as proxy to the public or private HLR, and to derive the user information from the encrypted message.
- The EAP interface listens on well-known RADIUS server port, and processes only those RADIUS messages that contain EAP attributes to perform an EAP authentication (Identity request, access challenge(s), EAP success or failure) procedure to complete user authentication
- Frames RADIUS access accept message with all the useful WLAN subscriber profile information provisioned at the public or private HLR.

Finally, in one embodiment, a subscriber management user interface (SMGUI 414) is provided to allow provisioning of the WLAN 228 service attributes including, for example, display of read-only attributes of the communication system 200. In one version of this embodiment, the display of the SMGUI 414 could be auto refreshed using an asynchronous mechanism with the private HLR 316. Alternatively, for simplicity of implementation, a refresh button on the SMGUI 414 could be used to get updates from the private HLR 316.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

The present disclosure is written for ease of understanding by those of skill in the art. For others, the following documents, incorporated herein by reference for all purposes, may be reviewed for additional information.

Local and Metropolitan Area Networks, IEEE Standard for Wireless LAN Medium Access Control (MAC) and Physical Layer (PHY) specifications, IEEE Std. 802.11-1997, pp. 34-59 and pp. 123-128

"HiperLAN: The High Performance Radio Local Area Network Standard", by G. A. Halls, Elec. & Comm. Eng. Journal, Dec. 1994, pp. 289-296

What is claimed is:

1. A communication system for providing voice and data communication between a public network and a plurality of user equipment terminals (UEs) at a plurality of locations, the communication system comprising:

a community wireless local area network (WLAN) comprising fixed equipment that includes:
a centralized base transceiver station (CBTS) coupled to the public network; and
a plurality of remote transceiver stations (RTSs) each coupled to a number of the plurality of UEs, and, via a radio link, to the CBTS, whereby the voice and data communication is provided between the public network and the plurality of UEs;

wherein at least one of the RTSs is located at each of the plurality of locations; and wherein the CBTS and each RTS comprises a respective Global Systems for Mobile communication/General Packet Radio Service (GSM/GPRS) transceiver for communications therebetween in order to provide data communication between the public network and the plurality of UEs;

wherein respective GSM/GPRS radio frequency signals transmitted by the CBTS to the RTSs and by each RTS to the CBTS are frequency converted from respective first frequencies within conventional GSM frequency bands to respective second frequencies above the conventional GSM frequency bands; and wherein the respective frequency-converted GSM/GPRS radio frequency signals received by the CBTS from the RTSs and by each RTS from the CBTS are frequency converted from respective second frequencies above the conventional GSM frequency bands to respective first frequencies within the conventional GSM frequency bands.

2. The communication system according to claim 1, wherein the public network comprises a public switched telephone network and an Internet, and wherein the CBTS is coupled to the public network via a trunk.

3. The communication system according to claim 1, wherein the CBTS and each RTS further comprises a WLAN transceiver to provide voice communication between the public network and the plurality of UEs.

4. The communication system according to claim 3, wherein the WLAN transceiver is compatible with an open standard protocol selected from a group consisting of: High Performance Local Area Network (HiperLAN/1); High Performance Local Area Network (HiperLAN/2); and Institute of Electrical and Electronics Engineers 802.11 (IEEE 802.11).

5. The communication system according to claim 1, wherein the CBTS and each of the plurality of RTSs includes a frequency converter.

6. The communication system according to claim 1, wherein the public network comprises a public switched telephone network and the Internet, and wherein the CBTS is coupled to the public network via a public wireless network.

7. A system comprising:
a centralized base transceiver station (CBTS) coupled to a public network; and
a plurality of remote transceiver stations (RTSs), each coupled to a plurality of user equipment terminals (UEs) at a plurality of locations, and, via a radio link, to the CBTS;
wherein at least one of the RTSs is located at each of the plurality of locations; and
wherein the CBTS and each RTS comprises:
a respective Global Systems for Mobile communication (GSM) transceiver that transmits and receives GSM radio frequency signals at frequencies within conventional GSM frequency bands; and
a respective frequency converter;
wherein respective GSM radio frequency signals transmitted by the CBTS to the RTSs and by each RTS to the CBTS are frequency converted by the respective frequency converter from respective first frequencies within conventional GSM frequency bands to respective second frequencies above the conventional GSM frequency bands; and wherein the respective frequency-converted GSM radio frequency signals received by the CBTS from the RTSs and by each RTS from the CBTS are frequency converted by the respective frequency converter from respective second frequencies above the conventional GSM frequency bands to respective first frequencies within the conventional GSM frequency bands.

8. The system according to claim 7, wherein each GSM transceiver is adapted to communicate using GSM technology at a frequency band within (ETSI) specification.

9. The system according to claim 8, wherein each GSM transceiver is adapted to communicate using GSM technology at a frequency band of at least about 3.5 Ghz.

10. The system according to claim 7, wherein each GSM transceiver is a respective GSM/General Packet Radio Service (GSM/GPRS) transceiver, and wherein the CBTS and each RTS is adapted to communicate data.

11. In a communication system including a community wireless local area network (WLAN) comprising fixed equipment that includes a centralized base transceiver station (CBTS) coupled to a public network, and a plurality of remote transceiver stations (RTSs) each coupled to a number of a plurality of User Equipment terminals (UEs) located at a plurality of locations, and, via a radio link, to the CBTS, a method of providing voice and data communication between the plurality of UEs and the public network, the method comprising:
receiving call information in the community WLAN;
providing subscriber identification and security information for the UE to the community WLAN using at least one of the RTSs; and
coupling the UE to the public network over the community WLAN, wherein coupling the UE to the public network comprises coupling the CBTS to the RTS via a radio link using a GSM standard;
wherein at least one of the RTSs is located at each of the plurality of locations;
wherein the CBTS and each RTS comprises a respective Global Systems for Mobile communication/General Packet Radio Service (GSM/GPRS) transceiver for communications therebetween;
wherein respective GSM/GPRS radio frequency signals transmitted by the CBTS to the RTSs and by each RTS to the CBTS are frequency converted from respective first frequencies within conventional GSM frequency bands to respective second frequencies above the conventional GSM frequency bands; and
wherein the respective frequency-converted GSM/GPRS radio frequency signals received by the CBTS from the RTSs and by each RTS from the CBTS are frequency converted from respective second frequencies above the conventional GSM frequency bands to respective first frequencies within the conventional GSM frequency bands.

12. The method according to claim 11, wherein the public network comprises a public switched telephone network and an Internet, and wherein the step of coupling the UE to the public network comprises the step of coupling the CBTS to the public network via a trunk.

13. The method according to claim 11, wherein the CBTS and each RTS further comprises a WLAN transceiver, and wherein the step of coupling the UE to the public network comprises the step of coupling the CBTS to the RTS using a WLAN standard to provide voice communication between the public network and the plurality of UEs.

14. The method according to claim 13, wherein the WLAN standard is an open standard protocol selected from a group consisting of: High Performance Local Area Network (HiperLAN/1); High Performance Local Area Network (HiperLAN/2); and Institute of Electrical and Electronics Engineers 802.11 (IEEE 802.11).

15. The method according to claim 11, wherein the public network comprises a public switched telephone network and the Internet, and wherein the step of coupling the UE to the public network comprises the step of coupling the CBTS to the public network via a public wireless network.

* * * * *